US010386162B2

(12) United States Patent
Pearlson

(10) Patent No.: US 10,386,162 B2
(45) Date of Patent: Aug. 20, 2019

(54) AUTOMATIC APPARATUS FOR HIGH SPEED PRECISION PORTIONING OF GRANULES BY WEIGHT

(71) Applicant: ADR International Limited, Camara Bay (KY)

(72) Inventor: Daniel David Pearlson, Pacific Palisades, CA (US)

( * ) Notice: Subject to any disclaimer, the term of this patent is extended or adjusted under 35 U.S.C. 154(b) by 45 days.

(21) Appl. No.: 15/463,008

(22) Filed: Mar. 20, 2017

(65) Prior Publication Data

US 2017/0217693 A1 Aug. 3, 2017

Related U.S. Application Data

(62) Division of application No. 14/464,405, filed on Aug. 20, 2014, now Pat. No. 9,599,442.

(Continued)

(51) Int. Cl.

| | |
|---|---|
| ***F42B 5/16*** | (2006.01) |
| ***B65G 47/44*** | (2006.01) |
| ***G01G 13/04*** | (2006.01) |
| ***G01G 13/16*** | (2006.01) |
| ***G01G 13/24*** | (2006.01) |

(Continued)

(52) U.S. Cl.

CPC ................ *F42B 5/16* (2013.01); *B65G 15/44* (2013.01); *B65G 33/14* (2013.01); *B65G 47/44* (2013.01); *B65G 47/846* (2013.01); *B65G 65/40* (2013.01); *F42B 33/02* (2013.01); *F42B 33/0207* (2013.01); *F42B 33/0264* (2013.01); *F42B 33/0285* (2013.01); *F42B 33/0292* (2013.01);

(Continued)

(58) Field of Classification Search

CPC ........ F42B 5/16; F42B 33/02; F42B 33/0207; F42B 33/0264; F42B 33/0285; F42B 33/0292; B65G 15/44; B65G 33/14; B65G 47/44; B65G 47/846; B65G 65/40; G01G 13/04; G01G 13/16; G01G 13/247; G01G 17/00

See application file for complete search history.

(56) References Cited

U.S. PATENT DOCUMENTS

| | | | |
|---|---|---|---|
| 906,214 | A | 12/1908 | Freeman |
| 1,891,038 | A | 12/1932 | Barros |

(Continued)

OTHER PUBLICATIONS

International Search Report and Written Opinion pertaining to PCT/US2015/018542 dated Jul. 6, 2015.

(Continued)

*Primary Examiner* — Randy W Gibson

(74) *Attorney, Agent, or Firm* — Dinsmore & Shohl LLP; Monika Jaensson

(57) ABSTRACT

An automated granule portioning system includes at least one volumetric measuring chamber capable of adjusting the volume of the chamber automatically to a programmed target volume and arranged to receive a first portion of granules into the chamber to fill the target volume. A transport system automatically delivers the target volume of granules from the chamber to a weighing device. A granule metering device dispenses granules and, depending on a signal from the weighing device that the first portion of granules is below a programmed target weight, dispenses granules to the first portion to increase the weight to achieve a second portion having the target weight.

17 Claims, 18 Drawing Sheets

Related U.S. Application Data

(60) Provisional application No. 61/947,274, filed on Mar. 3, 2014.

(51) Int. Cl.

| | |
|---|---|
| ***G01G 17/00*** | (2006.01) |
| ***B65G 65/40*** | (2006.01) |
| ***F42B 33/02*** | (2006.01) |
| ***B65G 15/44*** | (2006.01) |
| ***B65G 33/14*** | (2006.01) |
| ***B65G 47/84*** | (2006.01) |

(52) U.S. Cl.

CPC ............ *G01G 13/04* (2013.01); *G01G 13/16* (2013.01); *G01G 13/247* (2013.01); *G01G 17/00* (2013.01)

(56) References Cited

U.S. PATENT DOCUMENTS

| | | | | |
|---|---|---|---|---|
| 1,978,558 | A | | 10/1934 | Von Pritzelwitz Van Der Horst |
| 2,539,030 | A | | 1/1951 | Parker |
| 2,558,206 | A | | 6/1951 | Baird |
| 2,661,876 | A | | 12/1953 | Kindseth |
| 3,140,018 | A | | 7/1964 | Miller |
| 3,305,067 | A | | 2/1967 | Mayer |
| 3,340,641 | A | | 9/1967 | Recker |
| 3,407,656 | A | | 10/1968 | Chadenson et al. |
| 3,654,970 | A | | 4/1972 | Teboul |
| 3,708,025 | A | | 1/1973 | Soler et al. |
| 3,774,818 | A | | 11/1973 | Alexandrov et al. |
| 3,783,957 | A | | 1/1974 | Borghi |
| 3,802,522 | A | | 4/1974 | Thompson |
| 3,827,513 | A | | 8/1974 | Epstein |
| 3,938,440 | A | | 2/1976 | Dooley et al. |
| 3,977,483 | A | | 8/1976 | Greanias |
| 4,002,268 | A | | 1/1977 | McKinney |
| 4,108,337 | A | | 8/1978 | Iijima |
| 4,402,412 | A | | 9/1983 | Wood |
| 4,559,981 | A | | 12/1985 | Hirano |
| 4,696,356 | A | | 9/1987 | Ellion et al. |
| 4,893,966 | A | | 1/1990 | Roehl |
| 5,005,657 | A | | 4/1991 | Ellion et al. |
| 5,064,009 | A | | 11/1991 | Melcher et al. |
| 5,279,200 | A | | 1/1994 | Rose et al. |
| 5,332,870 | A | | 7/1994 | Strickler |
| 5,340,949 | A | * | 8/1994 | Fujimura .............. G01G 17/04 141/128 |
| 5,398,557 | A | | 3/1995 | Shimizu et al. |
| 5,409,137 | A | | 4/1995 | Bonomelli |
| 5,437,393 | A | | 8/1995 | Blicher et al. |
| 5,542,583 | A | | 8/1996 | Boyer et al. |
| 5,602,485 | A | | 2/1997 | Mayer et al. |
| 5,753,868 | A | | 5/1998 | Diem |
| 5,796,052 | A | | 8/1998 | Christmann et al. |
| 5,798,473 | A | | 8/1998 | Roblyer et al. |
| 6,056,027 | A | | 5/2000 | Patterson |
| 6,057,514 | A | * | 5/2000 | Maguire ............ B01F 15/0445 177/105 |
| 6,121,556 | A | | 9/2000 | Cole |
| 6,283,680 | B1 | | 9/2001 | Vidal |
| 6,472,615 | B1 | | 10/2002 | Carlson |
| 6,911,607 | B2 | | 6/2005 | Klijn |
| 7,383,971 | B2 | | 6/2008 | Hanaoka |
| 7,472,808 | B2 | | 1/2009 | Hanaoka |
| 7,950,423 | B2 | | 5/2011 | Poole et al. |
| 8,312,663 | B2 | | 11/2012 | Johnson |
| 9,221,561 | B2 | | 12/2015 | Maheshwari et al. |
| 2004/0245027 | A1 | | 12/2004 | Kawanishi et al. |
| 2005/0056339 | A1 | | 3/2005 | Beane |
| 2007/0131707 | A1 | | 6/2007 | Poole et al. |
| 2012/0227302 | A1 | | 9/2012 | Fonte |
| 2013/0139675 | A1 | | 6/2013 | Baxter et al. |
| 2014/0014414 | A1 | | 1/2014 | Kawanishi et al. |

OTHER PUBLICATIONS

International Preliminary Report on Patentability pertaining to PCT/US2015/018542 dated Sep. 15, 2016.

* cited by examiner

AUTOMATIC APPARATUS FOR HIGH SPEED PRECISION PORTIONING OF GRANULES BY WEIGHT

CROSS REFERENCE TO RELATED APPLICATIONS

This application is a divisional application of U.S. patent application Ser. No. 14/464,405 filed Aug. 20, 2014 which claims the benefit of U.S. Provisional Application 61/947,274, filed Mar. 3, 2014.

FIELD OF THE INVENTION

The present invention relates generally to the precise automatic measurement of granules by weight; and more particularly to the precise automatic high speed portioning of dry granular chemicals and compounds, such as in the mass production of ammunition cartridges.

BACKGROUND OF THE INVENTION

The measurement of portions of granulated compounds is a critical process in a wide range of manufacturing processes. As an example, without limiting the application of the present disclosure, in the manufacture of small arms ammunition cartridges, precise propellant loads are required to ensure that projectiles (bullets) are accelerated consistently. The prior art discloses various methods to measure the volume of propellant prior to being loaded into cartridge cases. Although the prior art also teaches several different methods of measuring the weight of portions of granules, the methods are either too slow or too inaccurate to be practically applied to the high speed mass production of precision small arms ammunition.

The size and density of propellant granules vary with each manufactured batch or "lot" of propellant. At present the density of each granule of propellant can vary by as much as 16%. Contributing factors to the variability of propellant lots include the temperature and humidity of the environment at the time propellant granules are manufactured, shipped, and handled; minute variations in the calibration of the equipment that determines the size of each granule; statistically anomalous granulation; and other factors. While volumetric measurement of spherically shaped propellant can be accurate to within one tenth of a grain (0.000229 ounces) of propellant granules of the same lot, because the size and specific density of granules in different lots is inconsistent, portions of measured propellant, and the specific impulse imparted when the propellant is fired, is significantly inconsistent from lot to lot. Moreover, ammunition propellant granules are designed in several different varieties of shapes and sizes for use with various types of cartridges and in various types of firearms. Non-spherical shapes and larger sizes are less accurately measured by volumetric means alone.

Additionally, the metering system should be capable of feeding the cartridge loading process at a rate consistent with the speed with which automatic cartridge loading apparatus are capable of assembly. Depending on the size and shape of cartridges being loaded, the speed with which modern cartridge loading systems operate can exceed 240 units per minute. Generally, the speed of production is constrained by the speed with which propellant can be apportioned and deposited into ammunition cartridge cases during assembly.

The prior art teaches various means of mechanically producing portions of granules. Whereas these processes may be reasonably accurate in the uniform portioning of spherical granules, volumetric measurement of granules that are not spherical in shape produce inconsistent results because the volume such granules occupy is affected by the position of the granules within the volume. As an example, granule flakes, as well as elongated cylindrical forms called "stick" granules, may either be randomly oriented or stacked. The density, and therefore the weight, of a small volume of flake or stick granules can significantly vary depending on the orientation of the granules within the volume of measurement.

Additionally, the most accurate methods of mechanically producing portions of granules by volume disclosed in prior art involve techniques such as worm screws and various methods of volume isolation by means of the movement of hard-edged volumetric capsules relative to hard-edged granule feed source tubes or troughs. These mechanical methods have a tendency to crush or slice non-spherical granules such as flake and stick shaped granules. Crushing and slicing propellant granules results with burn rate variations and inconsistency in the rate of acceleration of projectiles. This results with undesirable and inconsistent barrel pressure, projectile acceleration, muzzle velocity, and thereby accuracy, when ammunition is fired.

Military personnel are trained to select ammunition of the same lot where accuracy of fired projectiles is considered mission critical. By selecting ammunition of the same lot, it is assumed that each lot of ammunition contains the same lot of manufactured propellant material. Using a particular manufactured lot of spherical propellant material, the prior art can obtain volumetric measurement accuracy to within ten percent (10%) of a grain (0.000229 ounces) of each successively measured portion of granules. Since the specific density of a volume of propellant varies widely by manufactured lot, using the same volume to measure a different lot of propellant results with significant deviation between manufactured cartridges. However, volumetric measurement of various shapes of granules can be widely inconsistent. The volumetric measurement of flat or "flake" propellant, or elongated cylindrical forms, called "stick" propellants, are significantly less accurate by volume than spherical granules, called "ball" propellants. The shape of propellant granules is a critical design attribute of the propellant affecting the rate of burn and thereby the internal ballistics of ammunition when fired. The physical shape of propellant granules is a preferred means of regulating the internal pressure and the specific impulse imparted by during the propellant burn.

Moreover, the mass production of harmonically resonant ammunition, which in the best instance differentiates minutely precise variations in the weight of portions of propellant loads to a resolution of individual granules of propellant, the specific weight of propellant of various classes of harmonic loads necessitates that the granule metering system be capable of adjustment so as to consistently conform production to the specifically desired weight of propellant. It is well known that harmonically resonant or "tuned" ammunition, when matched to specific individual rifles, can more than double the accuracy of fired projectiles. However, because harmonically resonant ammunition requires precise portions of propellant measured to consistently match the rate of projectile acceleration with the harmonic properties of individual rifles, cost effective mass production of such ammunition has not been practicable. The present invention enables the mass production of such harmonically resonant ammunition by providing not only for more accurate measurement of propellant by weight, but also by enabling the automatic adjustment of portions of propellant to accurately differentiate between a range of propellant load classes so that users can reliably select the class that is most accurate when used with a particular rifle.

The most accurate way to measure granulated compounds is by weight. The accuracy of measurement and portioning by the present invention is consistent regardless of variations in the size, shape, density, and the volume of aggregates of various lots of granules of the same chemical or compound. In the production of ammunition propellant loads, provided that isolated portions of propellant do not contain crushed or sliced granules, the specific impulse, rate of burn, and internal ballistic pressure curves are most consistent.

SUMMARY

The present disclosure applies to the accurate portioning by weight of any granulated chemicals or compounds in industrial materials applications as diverse as, without limitation, pharmaceuticals, metallurgy, polymers, composites, ceramics, nanomaterials formulation and synthesis, and ammunition assembly.

The present disclosure is of a high speed automatic apparatus that precisely measures granular chemicals and compounds by weight and automatically recalibrates and adjusts portions to match desired target weights. Inconsistency in the size, shape, and density of the material both by manufactured lot as well within each lot, does not result with significant variation in the mass of the precisely measured portions. Moreover, the accuracy of portioning of granules by the disclosed apparatus can be to within the weight of an individual granule; and the apparatus avoids crushing and slicing of granules during processing.

As an example, without limiting applications of the present disclosure, a preferred embodiment of the present invention may be applied to the manufacture of ammunition. The accuracy of conventional ammunition when fired is significantly affected by the accuracy of propellant apportioned to cartridges during manufacture. In addition to precise uniformity of propellant loads, the present invention enables the mass production of harmonically resonant ammunition by providing not only for more accurate high speed measurement of propellant by weight, but also by enabling the automatic adjustment of portions of propellant to accurately differentiate between a range of propellant load classes such that users can reliably select the class of cartridge that is most accurate when used with a particular individual rifle.

The present disclosure also provides for the portioning by weight of ammunition propellant loads at rates equal to or greater than the nominal production rate of high speed automatic mass production cartridge assembly apparatus and is capable of exceeding 240 portions per minute.

The present invention also eliminates the need for manual calculation of the specific density of a manufactured lot of propellant. Volumetric measure of propellant requires such calculation to approximate the volume required to produce portions that approximate an intended product weight.

Additionally, volumetric measurement of non-spherical propellant used in rifle ammunition cartridges is notoriously inaccurate and frequently results with inconsistent cartridge loads.

According to an exemplary embodiment of the invention, the apparatus effectively improves the accuracy of the measure of portions of granules by weight. The physical shape, size, and weight of each of the granules of the type being processed are not significant to the accuracy of measure or to the speed with which they are processed. The accuracy of weight measurement of a portion of granules are within the weight of an individual granule regardless of the shape, size, physical configuration, or weight of the type of granules being processed.

According to the exemplary embodiment of the invention, the apparatus effectively avoids crushing or slicing spherical and non-spherical granules as the portions are measured and processed.

According to the exemplary embodiment of the invention, the apparatus can be entirely computer controlled such that no manual operator is necessary. The apparatus is capable of quick and automatic adjustment of the measure of each portion. The apparatus is capable of automatically purging the type of granules being processed so that another type can be processed. The measurement of the weight of each portion of granules can be accomplished without friction that could otherwise affect the accuracy of said weight measurement. The calibration of measures can be quickly and automatically accomplished.

According to the exemplary embodiment of the invention, the apparatus provides for the production of accurately measured portions at a rate comparable to the highest rate of consumption of such portions by subsequent manufacturing processes. The apparatus provides for extensibility to increase the practical production rate of the present invention as needed such that future increased production rates of subsequent manufacturing processes are possible without the replacement of the majority of the existing apparatus. The apparatus design configuration provides for a high MTBF (Mean Time Between Failure) of the apparatus as a whole. The apparatus design configuration provides for ease of maintenance, repair, and replacement of components that comprise the system.

Numerous other advantages and features of the present invention will become readily apparent from the following detailed description of the invention and the embodiments thereof, from the claims and from the accompanying drawings.

DETAILED DESCRIPTION

Figure 1:
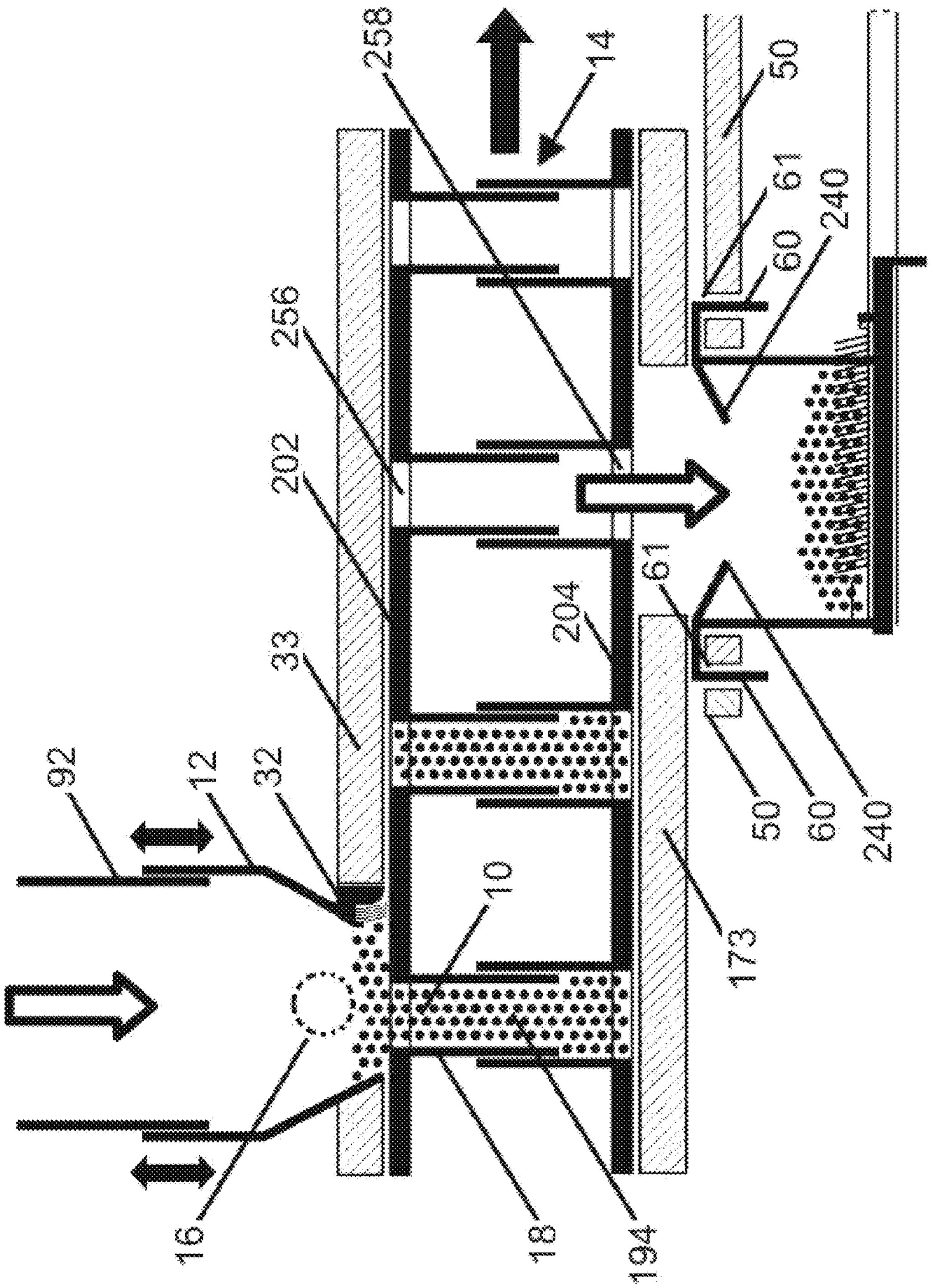
FIG. 1 is a schematic, sectional diagram of a volumetric portioning part of an apparatus according to the invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

This application incorporates by reference U.S. Provisional Application 61/947,274, filed Mar. 3, 2014, and U.S. application Ser. No. 14/464,339, filed on the same day as the present application, naming the same inventor.

The present invention comprises a number of unique innovations in the measurement and portioning of granular chemicals and compounds by mass. The application of the methods herein disclosed pertain to the accurate automated measurement and portioning of dry granulated chemicals and compounds in industrial materials applications as diverse as, without limitation, pharmaceuticals, metallurgy, polymers, coatings, composites, ceramics, and nanomaterials formulation and synthesis. Variation in the physical shape of the granules has no effect on the accuracy of granule portioning.

One advantageous use for the present invention is to precisely load ammunition to tune ammunition to the utilized rifle for shooting accuracy as described in U.S. Provisional Application 61/947,274, filed Mar. 3, 2014, and U.S. application Ser. No. 14/464,339, filed on the same day as the present application, naming the same inventor, herein incorporated by reference.

An exemplary embodiment of the invention shown in FIGS. 1-18A operates as follows Granular material 10 is retained by a granule source hopper 12 that releases small quantities of free flowing granular material so as to limit the weight of material bearing down on the volumetric metering system or volumetric assembly 14. A photo sensor 16 detects when the small portion of granules being fed into a chamber 18 of the volumetric assembly 14 requires replenishment. Granular material from the small portion of granules is fed by gravity into the volumetric assembly 14 comprised of a multiplicity of spring-loaded telescoping chambers 18, the compression of which, and thereby the interior volume of which, may be modified as needed by a gear mechanism 26 (FIG. 9) and stepper motor assembly 28 under the control of a computer. The material 10 is then acted on by a screed 32 on a screed plate 33. The screed includes a flexible steel and rubber mesh immediately followed by a round or angular surface to remove excess material from the top of the telescoping chamber 18 without slicing or crushing the granules as they are isolated in the chamber. The resulting volumetrically measured portion of the subject material is transferred to a container of a granule cup assembly 36 as the volumetric assembly 14 rotates under the control of a further gear mechanism 44 and stepper motor 48 assembly under the control of the computer (FIG. 10). The granule cup assembly 36 is itself located in a position on a rotational plate or platform 50 holding a plurality of additional granule cup assemblies 36. As the rotational platform 50 rotates, it delivers the subject granule cup assembly 36 containing the granular portion to a scale 56. The granule cup assembly 36 is installed on the rotational platform 50 such that it rests through a hole in the rotational platform and is able to move vertically without obstruction, held axially in position by two positioning pins 60 that also pass through the rotational platform 50. When the granule cup assembly 36 is positioned in the center of the scale 56, the rotational platform rotates minutely backward so that the granule cup assembly 36 and positioning pins 60 are free standing on the scale 56 with preferably no point whatsoever in contact with the rotational platform 50; thus eliminating any possible friction between the rotational platform 50 and the granule cup assembly 36 that might otherwise adversely affect the accuracy of weight measurement. The granule cup assembly 36 and subject material portion 10 are then weighed to determine, less the weight of the container, an exact weight measurement of the subject material 10.

If the material 10 is overweight, the computer causes the retention of the material as the rotational platform 50, under computer control, causes the granule cup assembly 36 to pass over other stations until the subject granule cup assembly is positioned where the overweight portion may be dumped. Preferably, the granule cup assembly 36 is emptied of all granules during the dump. The subject material is dumped into a chute 66 that directs the material 10 into a container 70 for rejected granule portions so that the material 10 may be reprocessed. Simultaneously, the computer causes the interior volumes of the volumetric assembly's 14 volumetric measurement chambers 18 to be automatically incrementally reduced, thus reducing the weight of subsequent granule portions.

If the weight of the subject portion 10 is more than a small number of granules underweight, the computer causes the retention of the material as the rotational platform 50, under computer control, causes the granule cup assembly 36 to pass over other stations until the subject granule cup assembly 36 is positioned where the underweight portion may be dumped. Preferably, the granule cup assembly 36 is emptied of all granules during the dump. The subject material 10 is dumped into a chute that directs the material into a container for rejected granule portions so that the material may be reprocessed. Simultaneously, the computer causes the interior volumes of the volumetric assembly's 14 volumetric measurement chambers 18 to be automatically incrementally increased, thus increasing the weight of subsequent granule portions.

When the weight of the subject volumetric measure is equal to or slightly less than, but never over, the target weight specification, the automatic volumetric calibration is complete. However, automatic volumetric calibration is reinitiated whenever this said condition is no longer valid.

With the subject granule cup assembly 36 is in position on the scale 56, a granule meter assembly 80 that can be computer controlled, adds a small number of additional individual granules 10 until the target weight of the portion is achieved to within the weight of an individual granule 10. Any error causing an overweight portion in this instance does not initiate volumetric calibration, but the computer causes the retention of the material as the rotational platform, under computer control, rotates the granule cup assembly 36 to pass it over other stations until the subject granule cup assembly 36 is positioned where the overweight portion may be dumped. Preferably, the granule cup assembly 36 is emptied of all granules during the dump. The subject material is dumped into the chute 66 that directs the material into the container 70 for rejected granule portions so that the material may be reprocessed.

When a weighed portion of granules meets the target weight specification, the computer causes the rotational platform 50 to move the subject granule cup assembly 36 to where the portion may be delivered by means of a chute 88 to a granule consolidation assembly 92 to time the release of the portion for further processing depending on the intended application of the subject material. Preferably, the granule cup assembly 36 is emptied of all granules during the delivery to the chute 88.

The operation of the granule meter assembly 80 is as follows: granular material is retained by a second granule source hopper 96 that releases small quantities of free flowing granular material 10 so as to limit the weight of material bearing down into the internal working of the granule meter assembly 80; a horizontal conveyor 106 limits the flow and regulates the feed rate of granular material 10 into the assembly 80; a narrow inclined conveyor 110 with compartments, cups, indentations, or depressions 116 such that only one granule of the type being processed may be situated within a compartment 116 at one time and moves and isolates individual granules in preparation for release from the assembly; a gear mechanism 122 drives the action of both conveyors 106, 110 where the horizontal conveyor 106 is slower than the inclined conveyor 110; a computer controlled stepper motor 128 drives the gear mechanism 122; a V-shaped trough 134 directs the flow of granules 10 onto the inclined conveyor 110 when they fall from the horizontal conveyor 106; an electric motor 140 with an off-axis weight, or a transducer, vibrates the V-shaped trough 134; a brush 144 prohibits back spilling granules 10 as they are fed to the V-shaped trough 134 from the horizontal conveyor 106; a brush 148 at the apex 152 of the inclined conveyor 110 clears granules 10 not properly seated within a compartment 116 of the inclined conveyor 110; a photo sensor 160 at the apex 152 of the inclined conveyor 110 verifies the presence of an individual granule 10; a chute 166 directs individual granules 10 as they fall from the end of the inclined conveyor 110 to an exit port 288 of the granule meter assembly 80; a photo sensor 176 at the exit port 288 of the granule meter assembly 80 verifies the release of an individual granule 10; and a computer controlled solenoid 182 closes an exit port hatch 172 of the granule meter assembly whenever a granule cup assembly 36 is not at rest in position on the scale.

FIG. 1 is a diagram showing the granule metering process whereby the interior volume of a telescoping cylinder 18 controls the volume of granules to be weighed. Also indicated is a cross section of a portion of a rotational platform containing a granule cup assembly 36 into which metered granules are deposited.

FIG. 1 shows the granule feed hopper 12. FIG. 1 shows the photo sensor 16 that triggers the computer controlled release of granules from the granule source hopper 12 when the chamber 18 is low. Granules 10 are gravity fed into the granule feed hopper 12 in small quantities to reduce pressure as granules 10 are fed into the volumetric chamber 18. The screed 32 then divides feed source granules 10 from the granules 10 that have been portioned in a chamber 18 of the volumetric assembly 14 as the chamber moves relative to a Base Plate 173 and the Screed Plate 33. FIG. 1 shows the side view of a flexible steel and rubber mesh embedded into the screed 32 of the volumetric assembly 14. The flexible steel and rubber mesh, together with a rounded or angular leading edge, pushes granules as the volumetric assembly is rotated relative to and between the screed plate 33 and the base plate 173 while avoiding slicing or crushing granules of any shape as the screed 32 divides an initial volumetric measurement of granules from the feed source. FIG. 1 shows a detachable feed tube 190 that carries granules from a hopper meter (FIG. 14) to the hopper 12.

The metered volume of granules is variable as required to most closely yield the target weight 194 of granules, equal to or less than the target weight parameter, as measured by the scale 56. This is accomplish as the screed plate 33 is moved vertically relative to the base plate 173 which changes the relative vertical position of the top and bottom chamber plates 202, 204 of the volumetric assembly 14. The vertical position of the screed plate 33 is automatically adjusted by means of computer control of a stepper motor 28 and gear configuration 26; an example of which configuration is provided in FIGS. 10-12. The top chamber plate 202 is separated from the screed plate 32 by means of a bearing ring (not shown) which maintains the relative vertical position of each plate 202, 33 while permitting the top chamber plate 202 to rotate in unison with the bottom chamber plate 204. The bottom chamber plate 204 is separated from the Base Plate 173 by means of a bearing ring (not shown) which maintains the relative vertical position of each plate 173, 204 while permitting the bottom plate 204 to rotate under computer control of a gear mechanism 230, and stepper motor assembly 234 (FIG. 10).

When a granule filled chamber 18 moves into position, the granules 10 drop, through a slosh ring 240, which is a part of each granule cup assembly 36, that inhibits the loss of any granules as the granule cup assembly 36 is rotated rapidly, and which sits on a rotational platform 50 that transports one or more granule cup assemblies 36. Preferably, the chamber 18 is emptied of all granules during the drop. The orientation of the granule cup assembly 36 is maintained by the positioning pins 60 that guide each granule cup assembly to freely move vertically as needed in the next process. Two or more pins 60 are provided which protrude through respective holes 61 through the plate 50.

Figure 2:
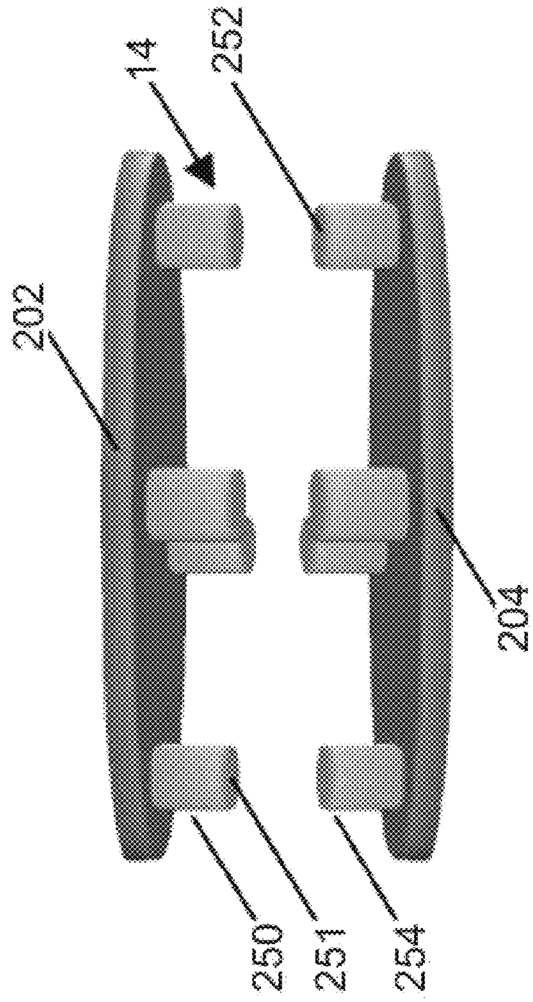
FIG. 2 is an exploded perspective view of a portion of the volumetric portioning part of FIG. 1.
Figure 2A:
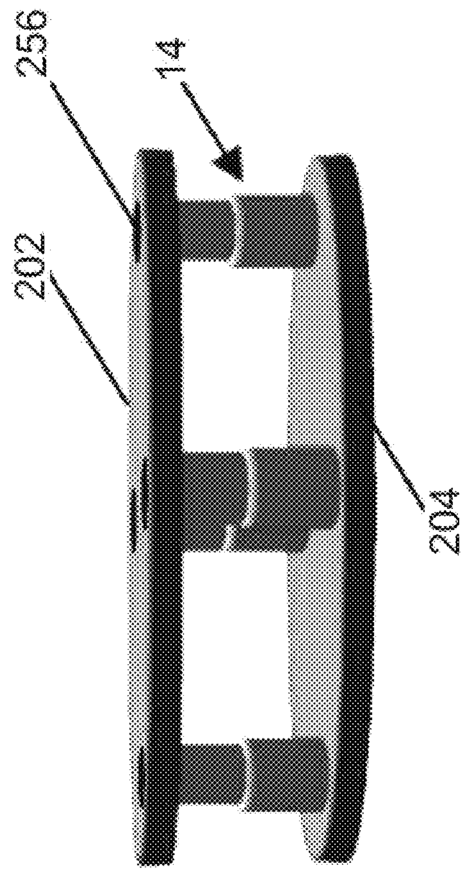
FIG. 2A is a perspective view of the portion shown in FIG. 2 in an assembled state.

FIGS. 2 and 2A are three dimensional drawings showing the relationship of the top and bottom portion of a rotational volume assembly that enables variable volumetric measurement of granules as in FIG. 1. The components are also shown in an assembled position (FIG. 2A).

The top and bottom plates 202, 204 incorporate top and bottom nesting or telescoping chamber tubes 250, 254. Openings 251, 252 in the chamber tubes 250, 254 permit the tubes to nest, thus providing a variable interior volume with variation in the proximity of the top and bottom plates 202, 204. Apertures 256, 258 through the top and bottom plates permit granules to enter each of the chambers 18 from above, and exit from below.

Figure 3:
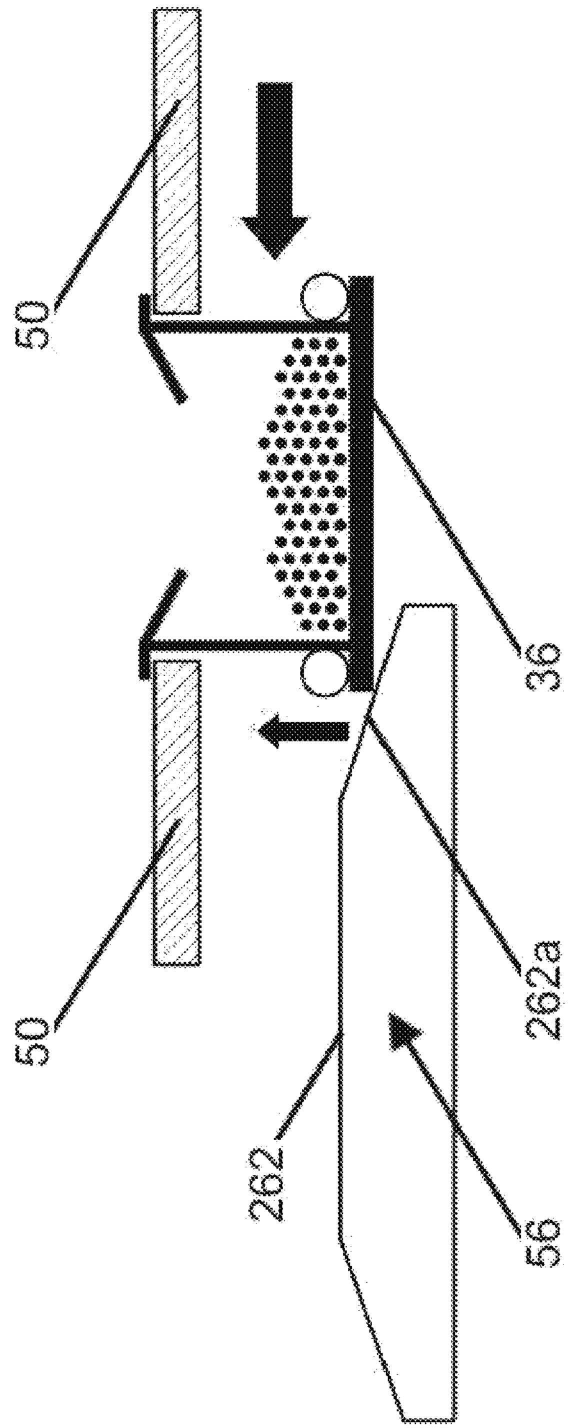
FIG. 3 is a schematic, sectional diagram of a weighing apparatus for a portion of the an apparatus according to the invention.

FIG. 3 is a diagram of a section of the rotational platform with a granule cup assembly 36 containing a metered portion of granules deposited by the volumetric measurement process of FIG. 1 as it encounters a scale platform so that the specific weight of the portion of granular aggregate may be measured.

FIG. 3 shows a section of the rotational platform 50 with a granule cup assembly 36 being moved into position for weight measurement. A replaceable steel platform cover 262 is depicted that fits on the top of the scale 56 with an incline leading edge 262*a* that lifts the granule cup assembly 36 permitting it to be centered on the scale 56 to be weighed thereby. As the platform cover 262 wears from continuous use it can be easily replaced as can worn granule cup assemblies 36.

Figure 4:
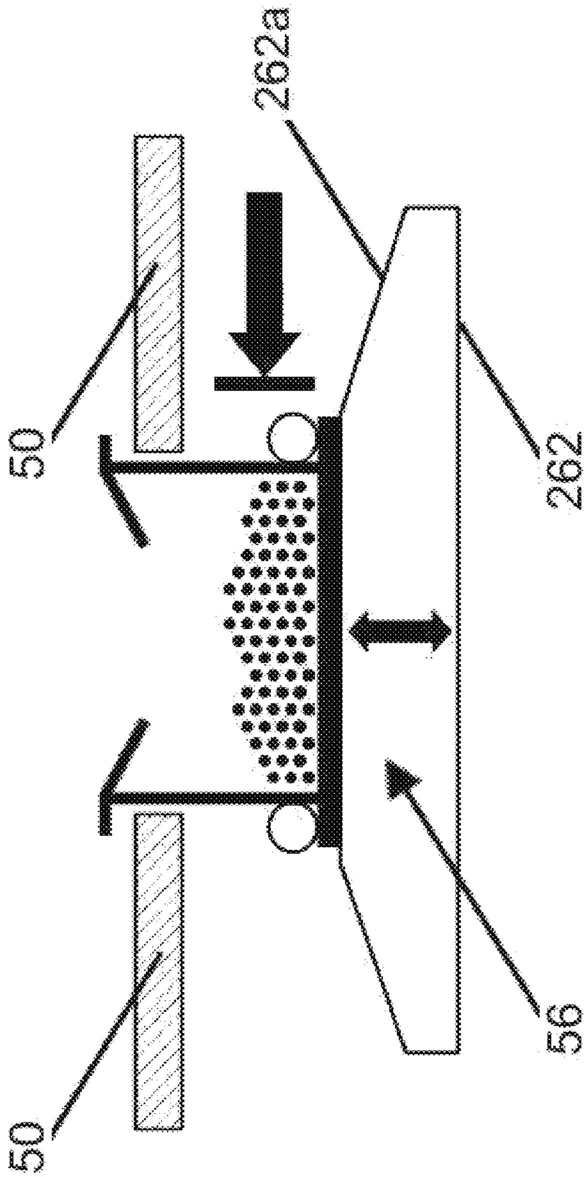
FIG. 4 is a schematic, sectional diagram of the weighing apparatus of FIG. 3 in a further stage of operation.

FIG. 4 is a diagram showing a granule cup assembly sitting on the scale as the rotational platform 50 is halted and the granule cup assembly 36 is able to freely rise and fall in relation to the rotational platform as its weight is measured by the scale 56.

FIG. 4 shows the granule cup assembly 36 containing a portion of granules being weighed. The granule cup assembly 36 can freely move vertically so that the weight of the assembly together with the portion of granules can be sampled. The total weight, less the weight of the granule cup assembly 36, yields the weight of the portion of granules.

Figure 5:
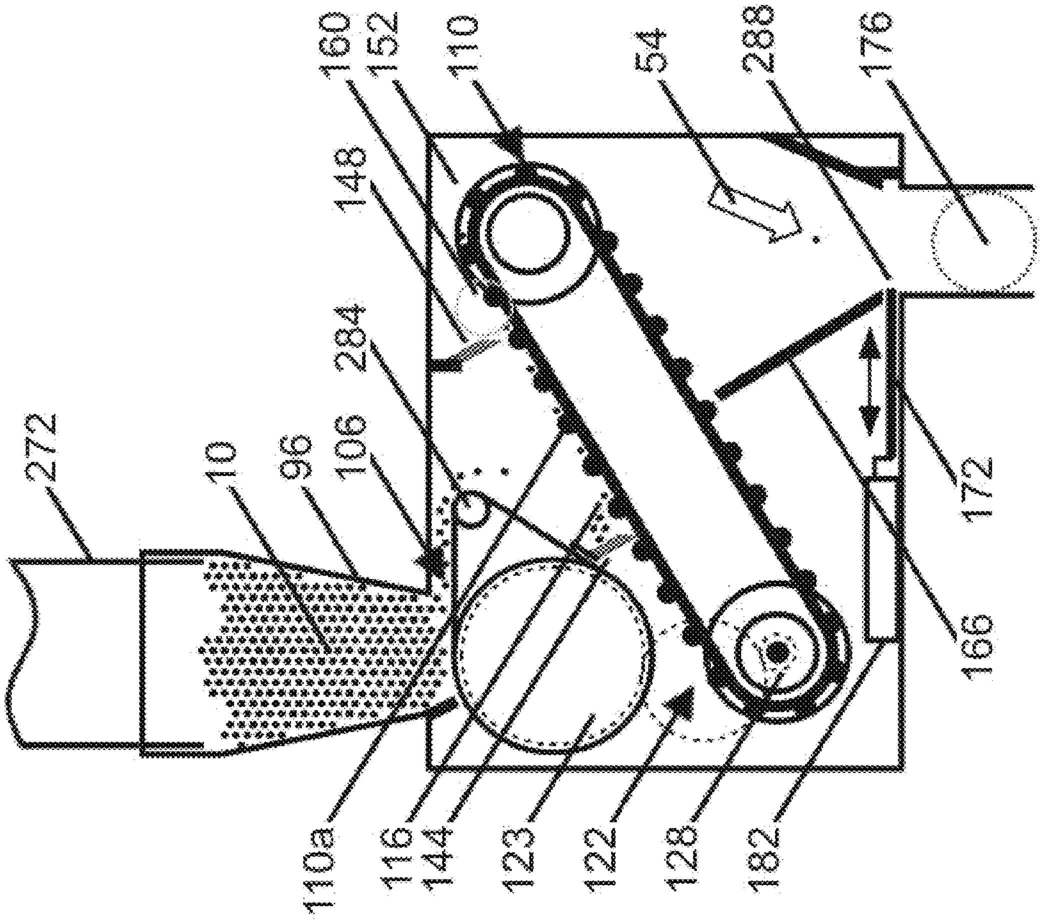
FIG. 5 is a schematic, sectional view of a weight portioning part of the apparatus according to the invention.

FIG. 5 is a diagram showing a granule meter assembly that can release individual granules, as needed, so that the weight of each granule cup assembly with the granular aggregate matches the target specification while the granule cup assembly is on the scale depicted in FIG. 4.

FIG. 5 shows a simplified side view of a granule meter assembly 80, a device that isolates and releases individual granules 10 to a waiting granule cup assembly 36 as it is being weighed as in FIG. 4. Granules may be added until the precise target weight specification is achieved. Granules are fed to the apparatus by means of a tube 272 and retained in the small hopper 96. The horizontal conveyor 106 drops small quantities of granules into a V-shaped inclined trough 134 (FIG. 6) vibrated by an electric motor 140 with an off-axis weight, or a transducer, so that an inclined conveyor 110 can capture individual granules 10. The V-shaped inclined trough 134 is vibrated by the electric motor 140 (FIG. 6) with an off-axis weight, or a transducer, to assist the movement of individual granules 10 onto the inclined conveyor 110. The surface 110*a* of the inclined conveyor 110 has nubs 116 sized and spaced to accommodate no more than one individual granule of the approximate shape and size being processed. A brush 141 prohibits granules from falling backward as the conveyor enters the V-shaped trough. A brush 148 near the apex 152 of the inclined trough 110 prohibits the release of more than one individual granule at a time. A photo detector 160 confirms the presence of each granule at the apex of the inclined conveyor 110. When each individual granule 10 is released (see arrow 54), the photo detector 176 confirms the release. A gate 172 is open during release, but closed during the movement of granule cup assemblies 36, actuated by a computer controlled solenoid 182. The inclined conveyor 110 is actuated by a stepper motor 128. A gear mechanism 122 advances the horizontal conveyor 106 via a gear mechanism 123 at a slower rate than the inclined conveyor 110 so that granules are not accumulated as they are fed to the inclined conveyor.

Figure 6:
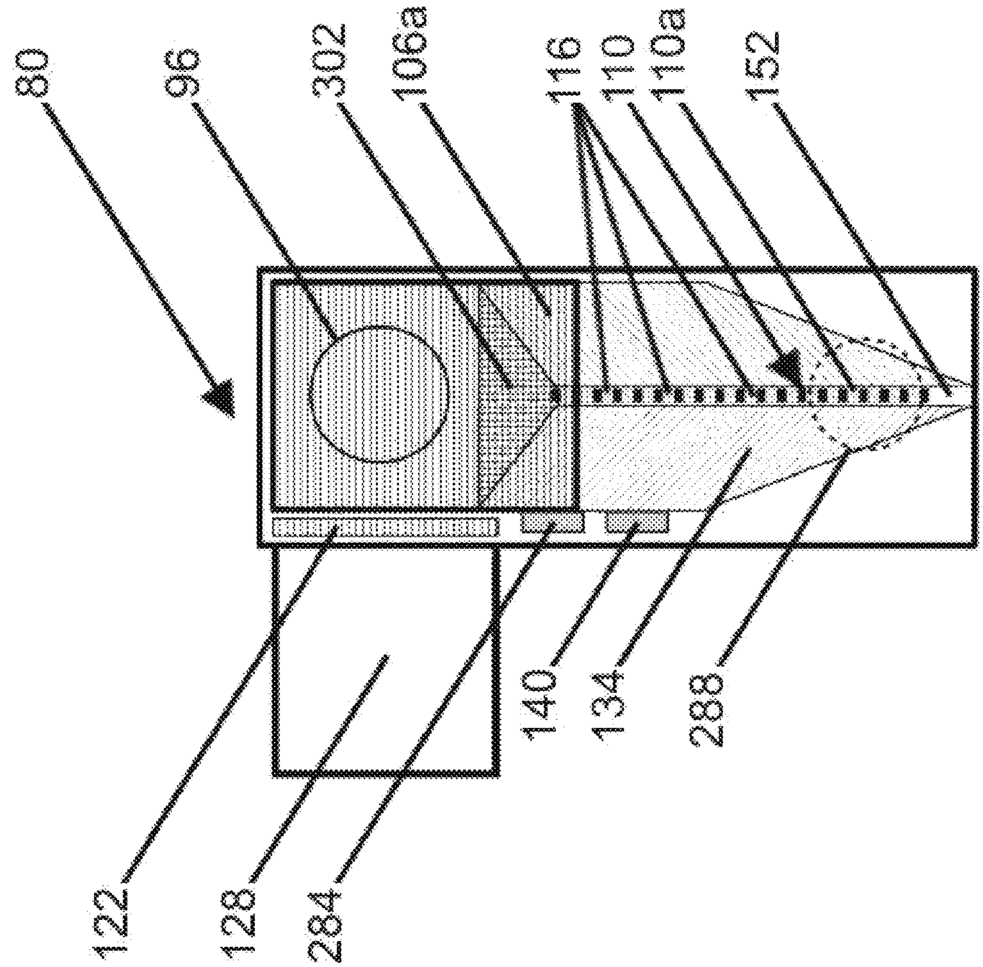
FIG. 6 is a plan view of the apparatus part shown in FIG. 5.

FIG. 6 shows a simplified top view of a granule meter assembly 80. The top of the gear mechanism 122 advances the horizontal conveyor 106. The stepper motor 128 that drives both the horizontal and inclined conveyors is shown. The horizontal conveyor's 106 unpowered roller 284 positions granules for their fall into the V-shaped trough 134. FIG. 6 shows the position of the outlet aperture 288 for individual granules as they exit the granule meter assembly. The granule hopper 96 is the inlet for granules for processing by the granule meter assembly 80. A V-shapes panel 302, beneath the horizontal conveyor 106 at the feed end of the V-shaped trough 134 confines granules and directs them onto the inclined conveyor 110. A relative position of the top surface 106*a* of the horizontal conveyor 106 is shown. A top surface 110*a* of the inclined conveyor 110 isolates and transports individual granules 10 (granules not shown) to the apex 152 of the conveyor 110 where individual granules are released.

Figure 7:
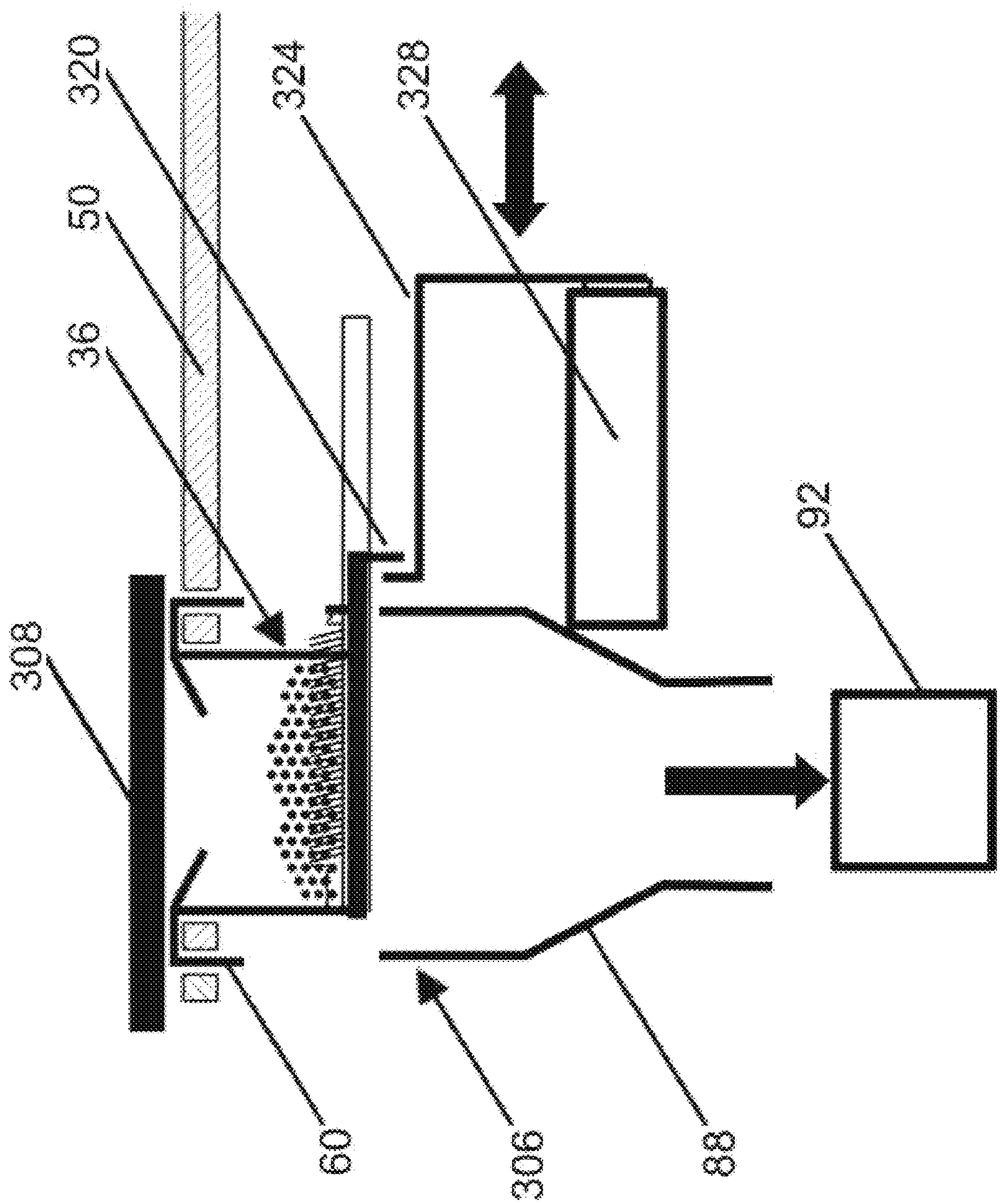
FIG. 7 is a schematic, sectional diagram of a dispensing part of the apparatus according to the invention.

FIG. 7 is a diagram showing the next station as the rotational platform delivers the granule cup assembly for release of granules into a chute.

Figure 15:
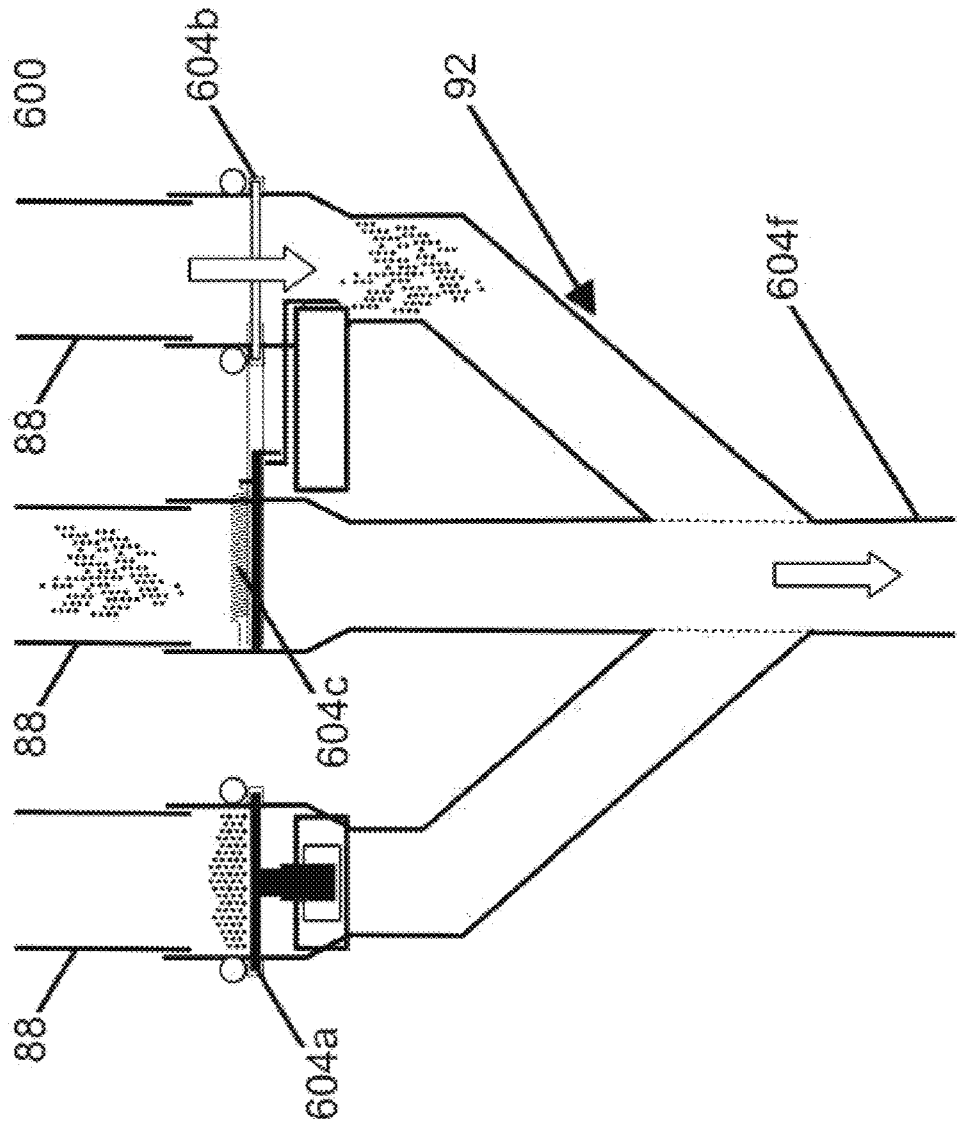
FIG. 15 is a schematic, sectional view of a granule consolidation assembly to be fed by the apparatus of FIG. 12.
Figure 16:
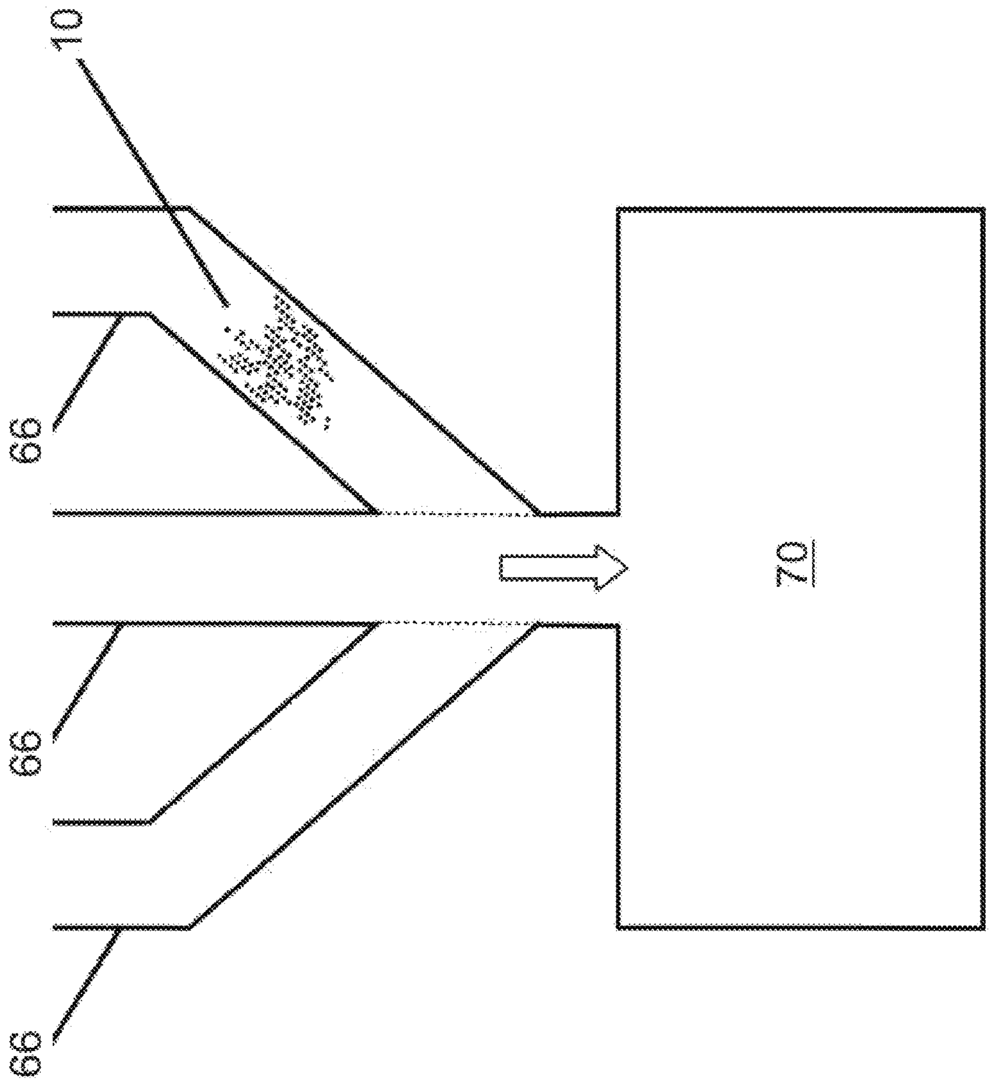
FIG. 16 is a schematic, sectional view of a tube consolidation and reject container to be fed by the apparatus of FIG. 12.

FIG. 7 shows one of two granule cup assembly release stations 306. A granule cup assembly 36 is first positioned by the rotational platform 50 over the fall chute 88 in preparation for release of the granules to the granule consolidation assembly 92 (FIG. 15). At this release station 306, only if the target weight of the granule aggregate is correct will the granules be released. If the initial volumetric measure exceeds the precise target weight specification, the granules will not be released. Instead, the granular aggregate will proceed to the next identical station where they will be released and accumulated in the overweight container 70 (FIG. 16). In each case, as a granule cup assembly 36 is positioned, a cover 308 stabilizes the granule cup assembly's vertical position for release. The granule cup assembly's release tab 320 is positioned so that the release arm 324 can engage the tab 320. A solenoid actuator 328 is shown in its idle position.

Figure 8:
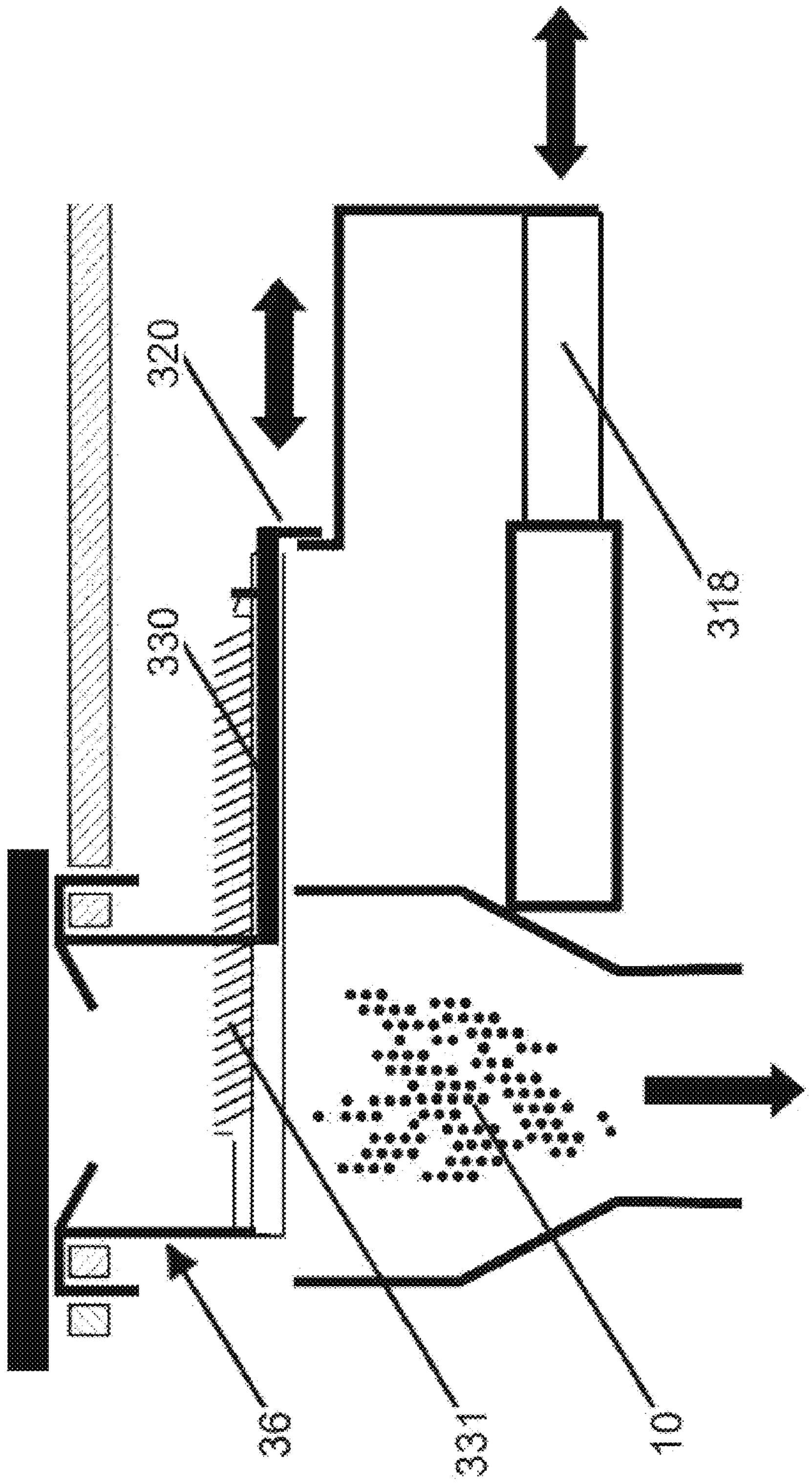
FIG. 8 is a schematic, sectional diagram of the dispensing part of FIG. 7 in a further stage of operation.

FIG. 8 is a diagram showing the release of the granular aggregate into the chute as a solenoid is actuated.

FIG. 8 shows the granule cup assembly 36 releasing its load with its spring loaded hatch 330, pulled toward closed by the spring 331, drawn open by the action of the solenoid 328 acting on the tab 320.

Figure 9:
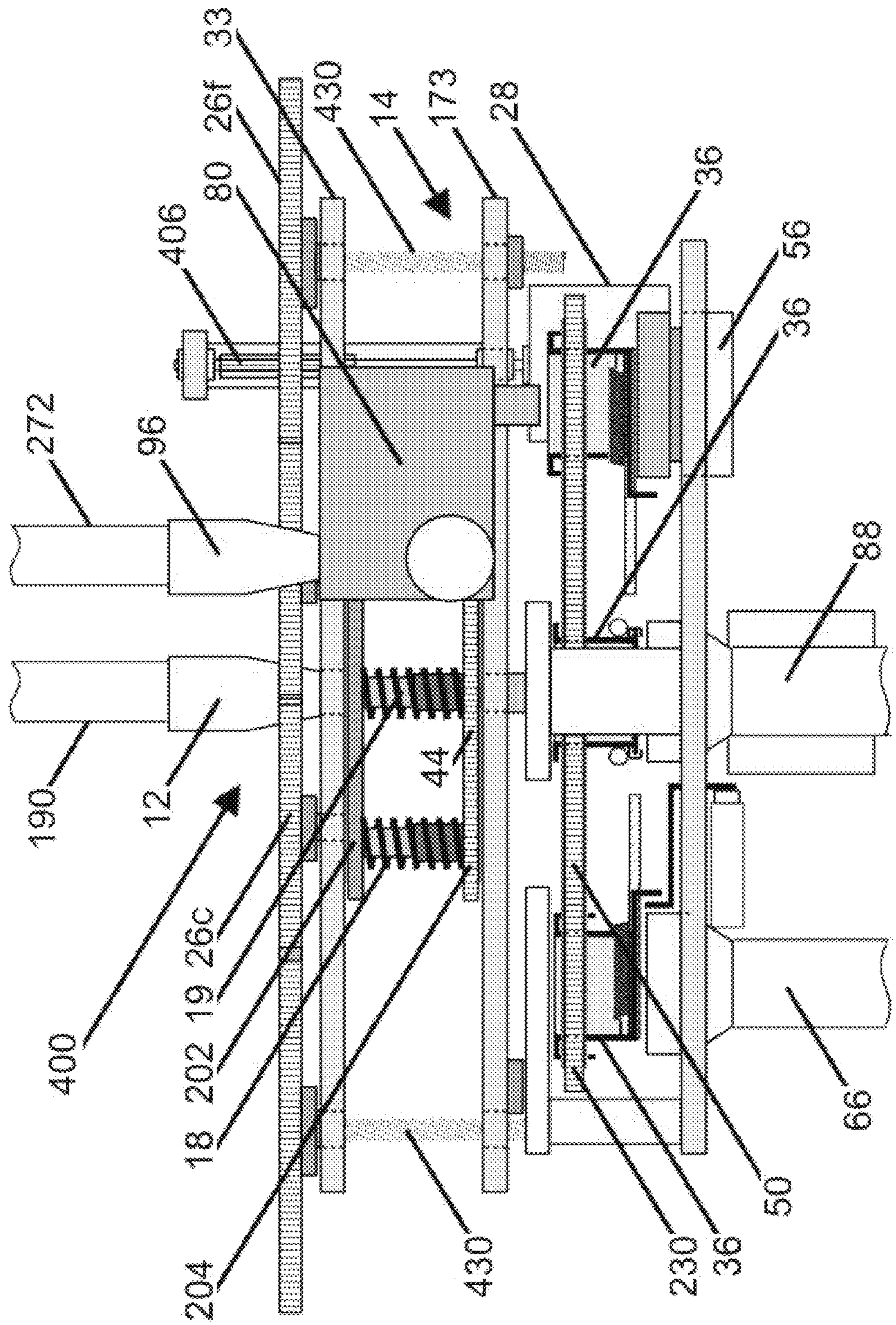
FIG. 9 is a front view of the apparatus according to the invention.
Figure 10:
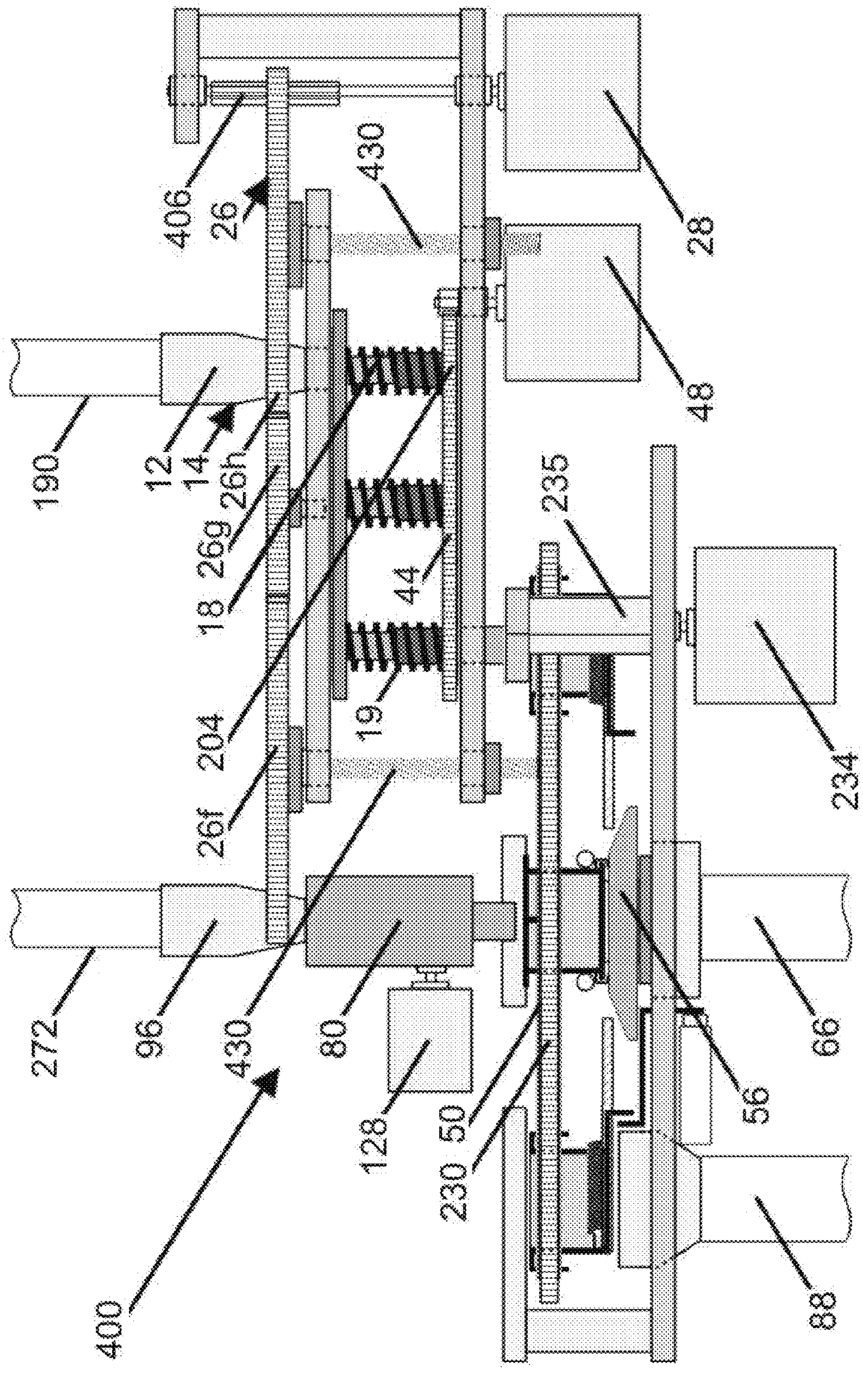
FIG. 10 is a side view of the apparatus of FIG. 9.

FIG. 9 is a drawing showing a front view of one complete modular assembly 400 including the location of the drive gear 406 for the spring loaded chamber tubes 18 sandwiched between the screed plate 33 and the base plate 173 of the volumetric assembly 14. Each tube 18 is surrounded by a coil spring 19, which is compressed as the plate 33 is adjusted to approach the plate 173. The chamber tubes 18 may also be advanced using a central shaft directly connected to a stepper motor or solenoid ratchet mechanism. FIG. 9 depicts the side of the gear mechanism 410 that compresses the spring loaded chamber tubes 18 of the volumetric assembly 14 causing the chamber tube assembly to telescope, uniformly expanding or reducing the interior volume of each chamber 18, thereby expanding or reducing the volume of initially portioned material as needed. FIG. 9 shows the granule source inlet 190 to the Volumetric Assembly. FIG. 9 depicts the granule hopper 96 that is the inlet for granules for processing by the granule meter assembly 80. FIG. 9 shows the drive gear 406 and shaft connected to the stepper motor 28 and advances the gear mechanism 26 that compresses the chamber tubes 18. FIG. 9 shows the location of the non-moving granule meter assembly 80, positioned over a granule cup assembly 36 in position on the scale 56. FIG. 9 shows a granule cup assembly 36 in position to release its granular aggregate into the feed chute 88 to deliver the granular aggregate to the next process. FIG. 9 shows a granule cup assembly 36 in position to release its overweight granular aggregate into the feed chute 66 to deliver its granular aggregate to a container for overweight granular aggregates rejected during the automatic portion calibration process and for any overweight granular aggregates produced during production cycles. FIG. 9 depicts a side view of the drive gear 230 that advances the rotational platform 50 into which the granule cup assemblies 36 are fitted. The rotational platform may also be advanced using a central shaft directly connected to a stepper motor or solenoid ratchet mechanism. FIG. 9 shows the location of one of four the worm gears (screw) 430 that contracts or expands the distance between the screed plate 33 and the Base Plate 173 of the volumetric assembly. Each of the gears 430 are rotated by a gear 26*a*, 26*c*, 26*f*, 26*h*, respectively (FIG. 11).

FIG. 10 is a drawing showing a side view of one complete modular assembly. FIG. 10 shows the granule source inlet 190 to the volumetric assembly 14. FIG. 10 shows the location of the worm gears (screw) 430 that contracts or expands the distance between the screed plate 33 and the base plate 173 of the volumetric assembly. FIG. 10 shows the location of the non-moving granule meter assembly 80 and the stepper motor 128 that powers its internal conveyors. FIG. 10 depicts a side view of the drive gear that advances the rotational platform 50 into which the granule cup assemblies 36 are fitted. FIG. 10 depicts the granule hopper 96 that is the inlet for granules for processing by the granule meter assembly 80. FIG. 10 depicts the side of the gear mechanism 26 that compresses the spring loaded chamber tubes 18 causing the chamber tubes to telescope, uniformly expanding or reducing the interior volume of each chamber 18, thereby expanding or reducing the volume of initially portioned material as needed. FIG. 10 depicts the location of the drive gear 44 for rotating the volumetric assembly 14. FIG. 10 shows the drive gear and shaft 406 connected to the stepper motor and advances the gear mechanism 26 that compresses the chamber tubes 18. FIG. 10 shows the feed chute 88 that delivers the granular aggregate to the next process. FIG. 10 shows the feed chute 66 that delivers granules to the container for overweight granular aggregates rejected during the automatic portion calibration process and for any overweight loads produced during production cycles.

Figure 11:
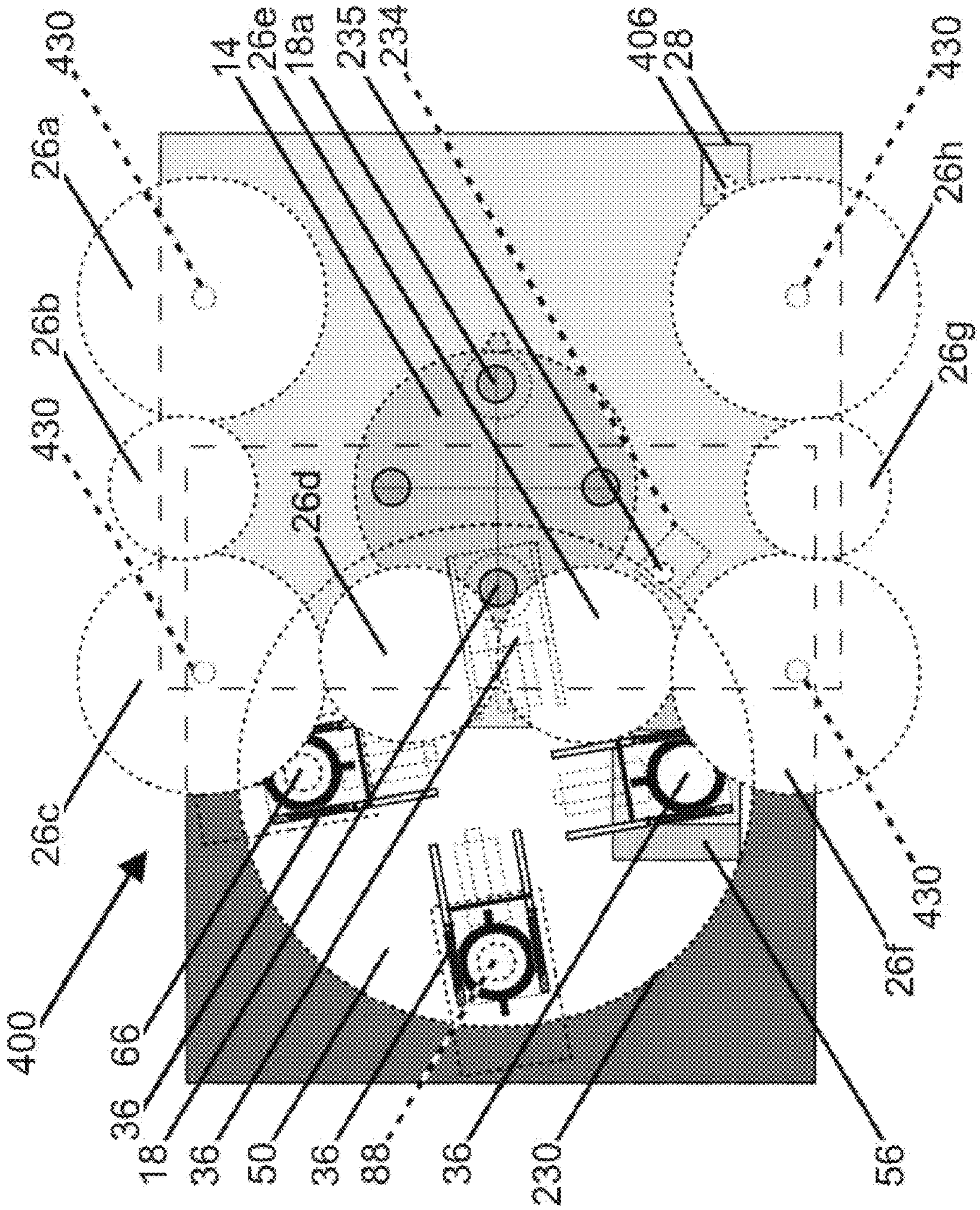
FIG. 11 is a plan view of the apparatus of FIG. 9.

FIG. 11 is a drawing showing a top view of one complete modular assembly 400. FIG. 11 shows the location of a volumetric chamber 18 positioned to drop its load into a granule cup assembly 36. FIG. 11 shows the top of the rotational platform 50 into which the granule cup assemblies are fitted. FIG. 11 shows a granule cup assembly positioned over the feed chute 88 that delivers the granular aggregate to the next process. FIG. 11 shows a granule cup assembly in position on the scale where the granule meter assembly 80 deposits individual granules as needed to achieve the target weight specification. FIG. 11 depicts the location of a granule cup assembly 36 positioned over the feed chute 66 that delivers granules to the container for overweight granular aggregates rejected during the automatic portion calibration process and for any overweight loads produced during production cycles. FIG. 11 identifies the first of eight gears 26*a*-26*h* in the gear mechanism that compresses the spring loaded chamber tube assembly 18 causing the chamber tube assembly to telescope, uniformly expanding or reducing the interior volume of each chamber 18, thereby expanding or reducing the volume of initially portioned material as needed. Gears 26*a*, 26*c*, 26*f*, and 26*h* drive the screws 430 while gears 26*b*, 26*d*, 26*e* and 26*g* are idler gears that ensure common rotation direction for gears 26*a*, 26*c*, 26*f*, 26*h*. FIG. 11 indicates the chamber plates 202, 204. FIG. 11 shows one 18*a* of the telescoping chamber tubes 18 in position to receive granules from the granule hopper and that is the inlet to modular assemblies for granule portioning. FIG. 11 shows the drive gear and shaft 235 connected to the stepper motor and advances the gear mechanism 230 that advances the rotational platform 50 into which the granule cup assemblies 36 are fitted. FIG. 11 shows the drive gear and shaft 406 connected to the stepper motor 28 and advances the gear mechanism 26*a*-26*h* that compresses the chamber plates 33, 173 that thereby expand or reduce the volume of initially portioned material as needed.

Figure 12:
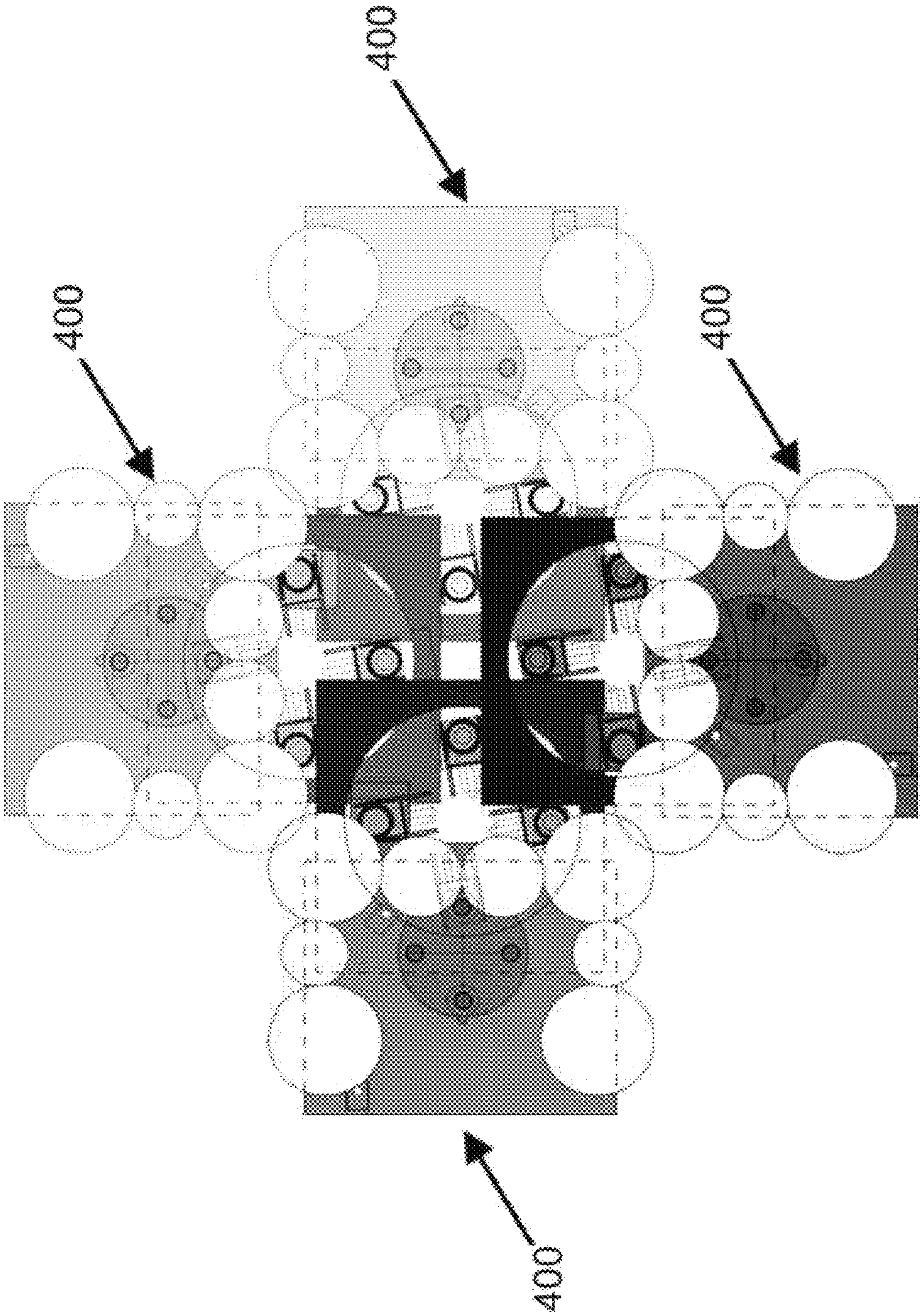
FIG. 12 is a plan view of a combination of four apparatus according to FIG. 9.

FIG. 12 is a drawing showing a top view of four modular assemblies 400, arranged in a cross pattern that complete one cycle assembly. Any number of modular assemblies can be combined in this fashion, as needed, to increase the rate of production of precise granule portions to match the feed rate of subsequent processing equipment in any application.

Figure 13:
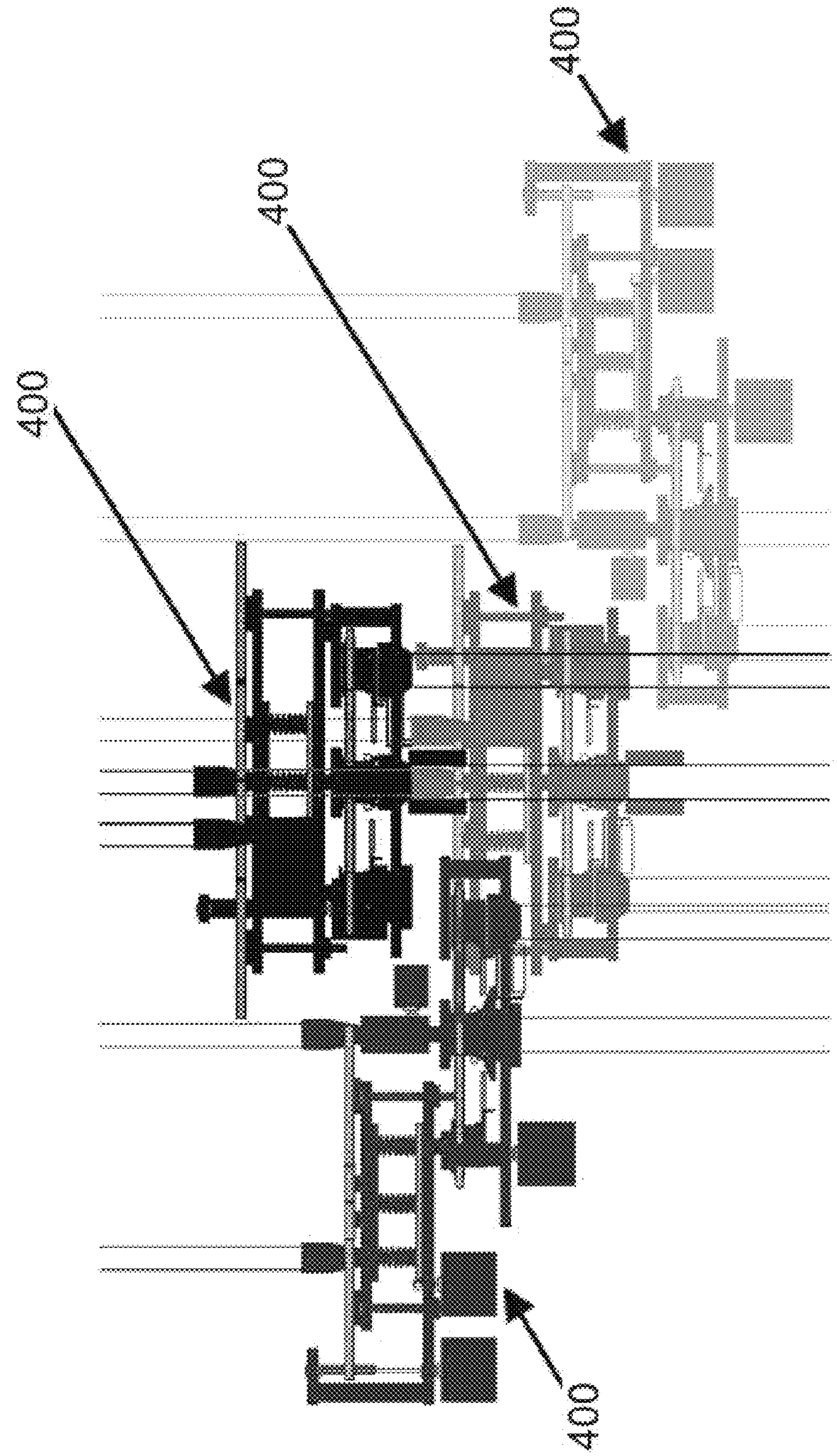
FIG. 13 is a front view of the apparatus of FIG. 12.

FIG. 13 is a drawing showing a side view of four modular assemblies that complete one cycle assembly.

Figure 14:
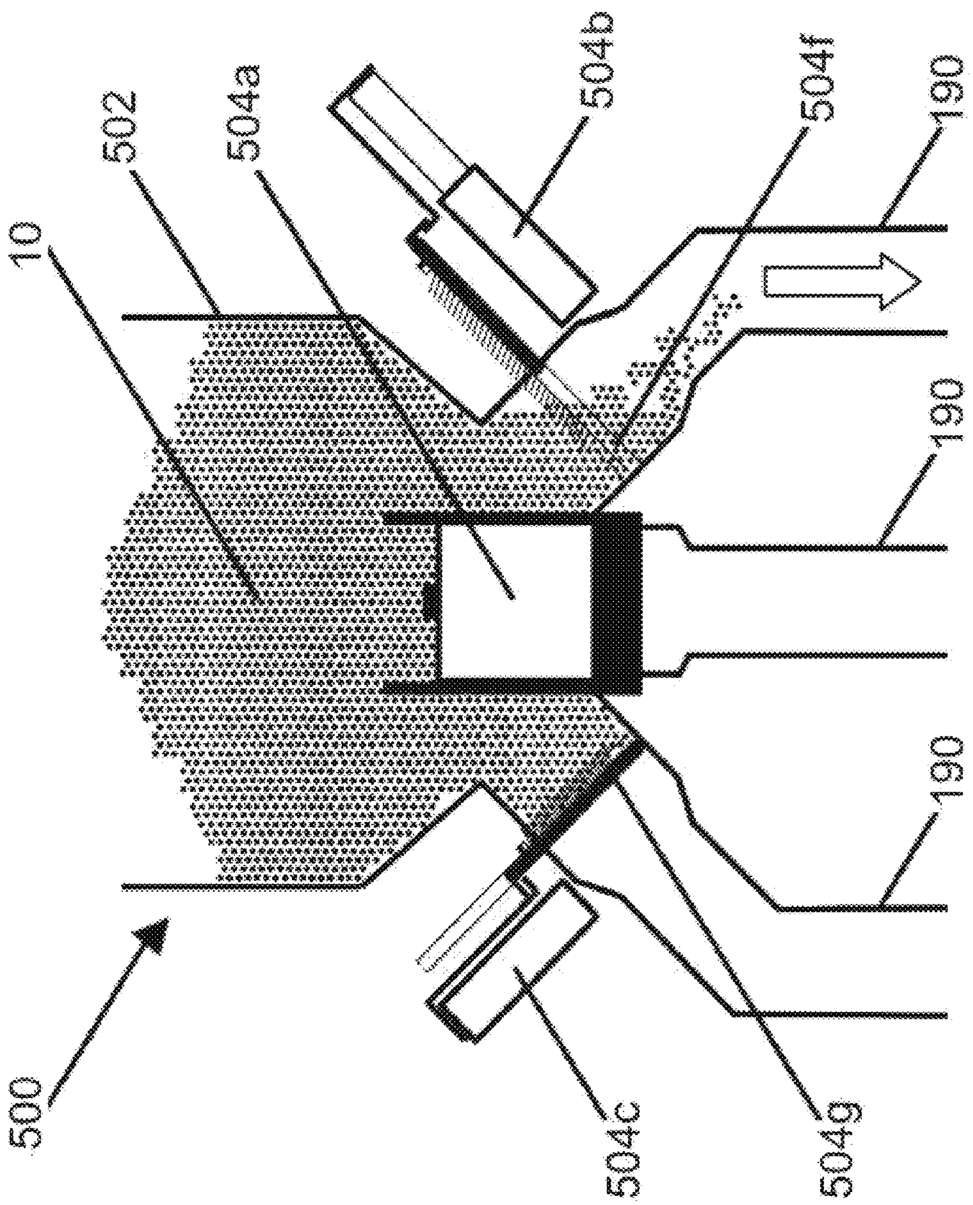
FIG. 14 is a schematic, sectional view of a granule source hopper for the apparatus of FIG. 12.

FIG. 14 is a diagram showing a side view of a granule source hopper 500, one of two for each complete cycle assembly. FIG. 14 shows a hopper 500 holding granules to be distributed to each of the modular assemblies by means of four solenoid controlled gates 504*a-d* (three shown). FIG. 14 shows the relative position of the solenoid of one of the solenoid controlled gates 504*a*. An identical gate is on the directly opposite side of the assembly (not shown). FIG. 14 shows a side view of one of the solenoid gates 504*b* with the solenoid actuated, and the gate 504*f* in the open position to allow granules to fall into the chute that feeds the granule hopper 96 that is the inlet for granules for processing by the granule meter assembly 80, or alternatively, the granule hopper 12 that is the inlet for granules for processing by the volumetric assembly 14. FIG. 14 shows a side view of the solenoid gate 504*c*, opposite the solenoid gate 504*b*, with solenoid in the idle position and the gate in the closed position to restrict the flow of granules.

Although separate hoppers 12, 96 are shown in the drawings, a common hopper could be used to feed both the volumetric assembly 14 and the metering assembly 80 (or 80') though tubes or ducts. Alternatively, a common hopper, such as the hopper 500, could feed the separate hoppers 12, 96 though tubes or ducts.

FIG. 15 is a diagram showing a side view of a granule consolidation assembly 600 for one complete cycle assembly including timing gates 604*a*, 604*b*, 604*c* for sequentially feeding subsequent processing equipment such as a cartridge loading machine. The diagram shows a side view of three timing gates with a fourth (not shown) behind the center gate 604*c*. The purpose of the device is to time the release of granular aggregates previously released into each of the four feed chutes 88 into which granule cup assemblies release granular aggregates to the next process. The device is utilized to serially feed granular aggregate at a rate exceeding the processing rate of an individual modular assembly 400 to processing equipment such as, as an example, a high speed automatic cartridge loader. FIG. 15 shows a solenoid actuated gate 604*a* that releases retained granular aggregate in series with each of the other gates. FIG. 15 shows the reverse side of a gate 604*b* releasing its granular aggregate. FIG. 15 shows how serially released granular aggregate product is consolidated to the feed tube 604*f* of an external processor.

FIG. 16 is a diagram showing a side view of tubes 66 consolidated to flow into the reject container 70 where overweight granular aggregates rejected during the automatic portion calibration process, and any overweight granular aggregates produced during production cycles from each of four modular assemblies that together comprise one complete cycle assembly, are collected.

Figure 17:
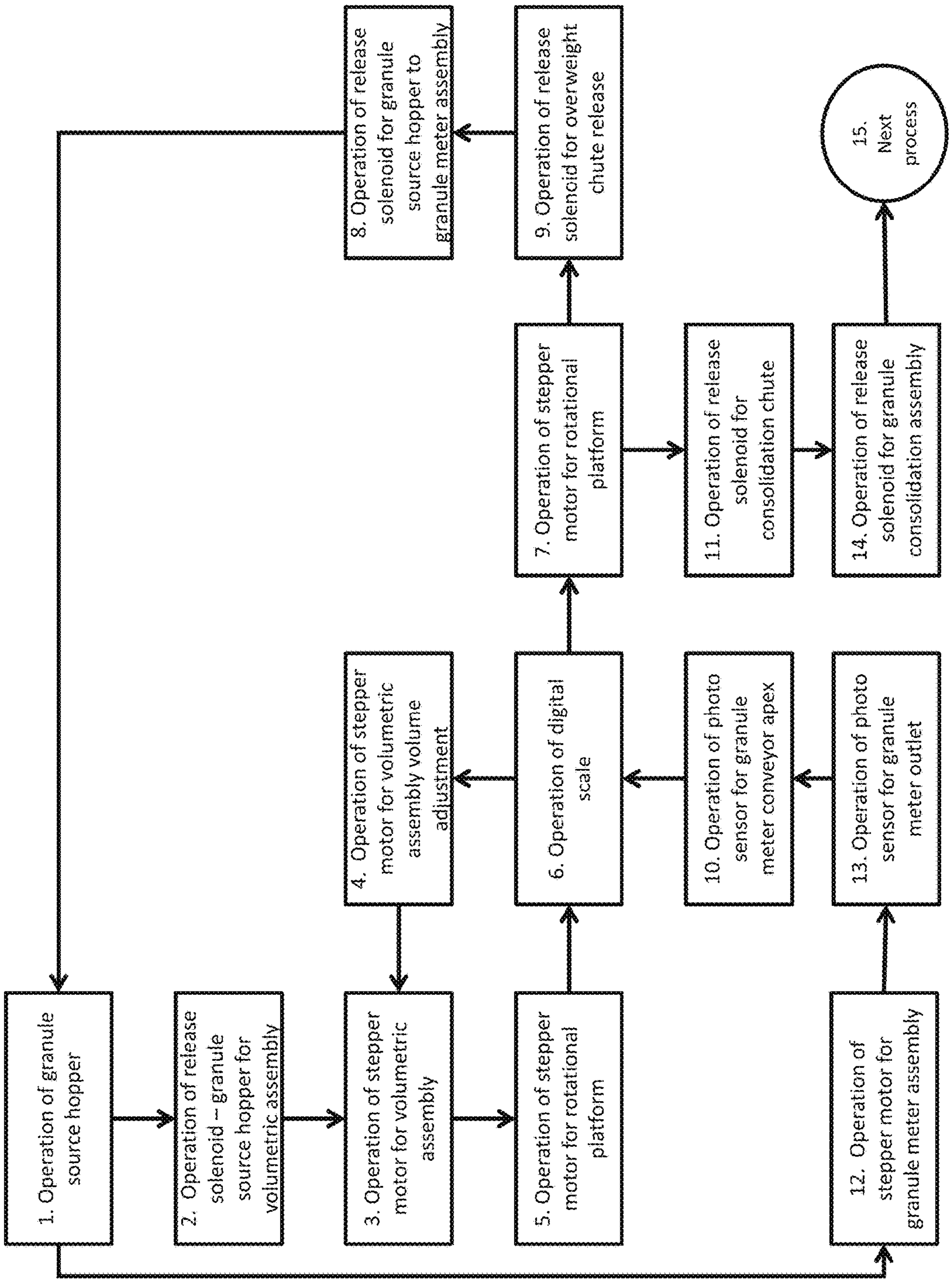
FIG. 17 is a process flow diagram for the apparatus of FIG. 9.

FIG. 17 is a process flow diagram of one complete modular assembly. The steps happen in overlapping time sequences and are not necessarily sequential. The steps and components of the flow diagram are as follows: Step 1 is the operation of the granule source hopper 502; Step 2 is the operation of the release solenoid 504*b*-granule source hopper for the volumetric assembly; Step 3 is the operation of the stepper motor 48 for the volumetric assembly; Step 4 is the operation of the stepper motor for the volumetric assembly volume adjustment 28; Step 5 is the operation of the stepper motor 234 for the rotational platform; Step 6 is the operation of the digital scale 56; Step 7 is the operation of the stepper motor 234 for the rotational platform; Step 8 is the operation of the release solenoid 504*b* for the granule source hopper to the granule meter assembly 80; Step 9 is the operation of the release solenoid 328 for the overweight chute release; Step 10 is the operation of the photo sensor 160 for the granule meter conveyor apex; Step 11 is the operation of the release solenoid 328 for the consolidation chute; Step 12 is the operation of the stepper motor 128 for the granule meter assembly 80; Step 13 is the operation of the photo sensor for the granule meter outlet 176; Step 14 is the operation of the release solenoid 604*b* for the granule consolidation assembly; and Step 15 represents the next process depending on the application.

Figure 18:
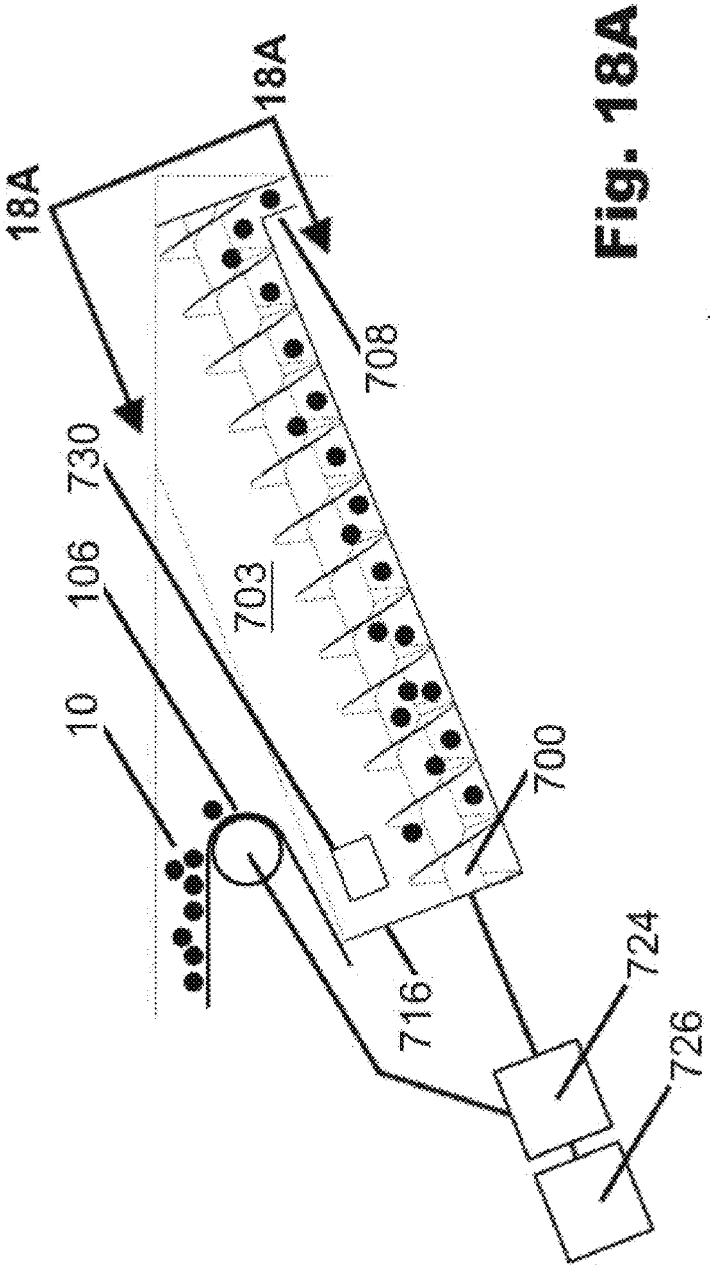
FIG. 18 is a schematic sectional view of an alternate dispensing conveyor to that shown in FIG. 5.
Figure 18A:
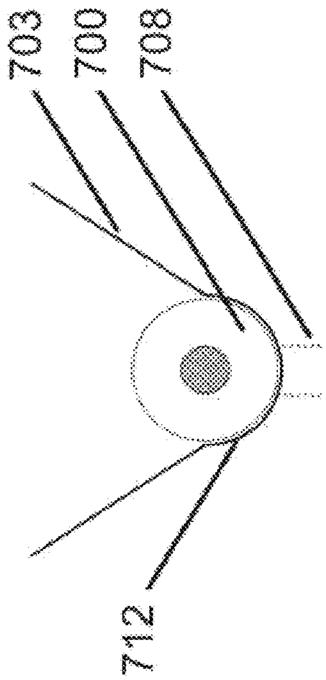
FIG. 18A is a sectional view taken generally along line 18A-18A in FIG. 18.

FIG. 18 illustrates an alternate embodiment granule meter assembly 80' to the granule meter assembly 80 shown in FIGS. 5 and 6. An inclined screw conveyor 700 replaces the inclined conveyor 110 detailed in FIGS. 5 and 6 of the application for Precision Portioning of Granules by Weight. The horizontal conveyor 106 deposits granules 10 in a V-shaped trough 703. The screw conveyor 700 includes an apex port 708 to release individual granules. The sensor is not shown, but is not deleted. The V-shaped trough 703 is open the entire length of the conveyor to avoid slicing or crushing granules of any shape. The trough 703 has a hemi-cylindrical bottom 712 to contain and escalate granules 10. FIG. 18A is a side view of the screw conveyor. The V-shaped trough 703 includes a back wall 716 to prohibit back-spill of the granules.

As described in FIG. 5, the horizontal conveyor 106 deposits granules 10 into the V-shaped trough 703 at a rate slower than they are escalated by the screw conveyor. A gear mechanism 724 and motor 726 to drive the two conveyors 106, 700 are shown schematically. The brushes in FIGS. 5 and 6 have been deleted. The V-shaped trough 703 is vibrated by means of a motor 730 with an off-axis weight or transducer. All other aspects of the granule meter assembly 80 remain the same.

The gates 504*a*-504*c* and 604*a*-604*c* can be spring loaded and configured like the hatch 330, spring 331 and solenoid 328 shown in FIG. 8.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. An apparatus for automated granule portioning, the apparatus comprising a volumetric assembly comprising at least one telescopic chamber and a gear mechanism capable of adjusting the volume of the telescopic chamber, the volumetric assembly being arranged to receive granules into the telescopic chamber to fill the volume of the telescopic chamber, wherein the granules received within the telescopic chamber are delivered to a granule cup assembly, and wherein the apparatus further comprises an inclined conveyor with compartments, cups, indentations or depressions such that only one granule may be situated within said compartment, cup, indentation or depression, to deliver individual granules to the granule cup assembly.

2. The apparatus for automated granule portioning of claim 1, further comprising a screed to remove excess granules from the top of the telescopic chamber.

3. The apparatus for automated granule portioning of claim 1, further comprising a scale, wherein the granules received into the telescopic chamber are weighed in comparison with a target weight and, in the event the weight of the granules exceed the target weight, the gear mechanism decreases the volume of the telescopic chamber incrementally.

4. The apparatus for automated granule portioning of claim 1, further comprising a scale, wherein the granules received into the telescopic chamber are weighed in comparison with a target weight and, in the event the weight of the granules is less than the target weight, the gear mechanism increases the volume of the telescopic chamber incrementally.

5. The apparatus for automated granule portioning of claim 1, further comprising a scale, wherein the granules received into the telescopic chamber are weighed in comparison with a target weight and, in the event the weight of the granules equals the target weight, the granules are released to an automatic cartridge loader.

6. The apparatus for automated granule portioning of claim 5, wherein the granules are delivered to a granule cup of the granule cup assembly for weighing, the granule cup comprising a release tab and a spring loaded hatch to release the granules from the granule cup.

7. The apparatus for automated granule portioning of claim 1, further comprising a scale, wherein the granule cup assembly is positioned on the scale when receiving granules from the inclined conveyor, until the granules in the granule cup assembly achieve a target weight.

8. An apparatus for automated granule portioning, the apparatus comprising a volumetric assembly comprising at least one telescopic chamber and a gear mechanism capable of adjusting the volume of the telescopic chamber, the volumetric assembly being arranged to receive granules into the telescopic chamber to fill the volume of the telescopic chamber, wherein the telescoping chamber comprises a spring loaded chamber tube assembly.

9. The apparatus for automated granule portioning of claim 1, wherein the inclined conveyor is a screw conveyor to deliver individual granules to the granule cup assembly.

10. The apparatus for automated granule portioning of claim 8, wherein the granules received within the telescopic chamber are delivered to a granule cup assembly, and the apparatus further comprises a screw conveyor to deliver individual granules to the granule cup assembly.

11. The apparatus for automated granule portioning of claim 8, further comprising a scale upon which the telescopic chamber is positioned, wherein the granules are received within the telescopic chamber until the granules in the telescopic chamber achieve a target weight.

12. The apparatus for automated granule portioning of claim 8, further comprising a screed to remove excess granules from the top of the telescopic chamber.

13. The apparatus for automated granule portioning of claim 8, further comprising a scale, wherein the granules received into the telescopic chamber are weighed in comparison with a target weight and, in the event the weight of the granules exceed the target weight, the gear mechanism decreases the volume of the telescopic chamber incrementally.

14. The apparatus for automated granule portioning of claim 8, further comprising a scale, wherein the granules received into the telescopic chamber are weighed in comparison with a target weight and, in the event the weight of the granules is less than the target weight, the gear mechanism increases the volume of the telescopic chamber incrementally.

15. The apparatus for automated granule portioning of claim 8, further comprising a scale, wherein the granules received into the telescopic chamber are weighed in comparison with a target weight and, in the event the weight of the granules equals the target weight, the granules are released to an automatic cartridge loader.

16. The apparatus for automated granule portioning of claim 8, wherein the granules received within the telescopic chamber are delivered to a granule cup assembly, and wherein the apparatus further comprises an inclined conveyor with compartments, cups, indentations or depressions such that only one granule may be situated within a compartment, cup, indentation or depression, to deliver individual granules to the granule cup assembly.

17. The apparatus for automated granule portioning of claim 16, wherein the granule cup comprises a release tab and a spring loaded hatch to release the granules from the cup.

* * * * *